(12) United States Patent
Chen et al.

(10) Patent No.: US 10,499,477 B2
(45) Date of Patent: Dec. 3, 2019

(54) METHODS AND APPARATUS FOR INFORMATION MANAGEMENT AND CONTROL OF OUTDOOR LIGHTING NETWORKS

(71) Applicant: KONINKLIJKE PHILIPS N.V., Eindhoven (NL)

(72) Inventors: Hongxin Chen, Shanghai (CN); Dave Alberto Tavares Cavalcanti, Mahopac, NY (US); Marcin Gramza, Eindhoven (NL); Liang Jia, Elmhurst, IL (US); Qing Li, Shanghai (CN); Daniel J. Piotrowski, Edison, NJ (US); Marek Zbigniew Szczerba, Eindhoven (NL); Marcin Krzysztof Szczodrak, New York, NY (US); Qin Zhao, Shanghai (CN); Hongqiang Zhai, Jersey City, NJ (US); Michael Alex Van Hartskamp, Eindhoven (NL); Martin Elixmann, Eindhoven (NL); Zhong Huang, Shanghai (CN); Fulong Ma, Shanghai (CN); Xianneng Peng, Shanghai (CN); Jianfeng Wang, Shanghai (CN); Yi Qiang Yu, Shanghai (CN); Kiran Srinivas Challapali, New City, NY (US)

(73) Assignee: SIGNIFY HOLDING B.V., Eindhoven (NL)

( * ) Notice: Subject to any disclaimer, the term of this patent is extended or adjusted under 35 U.S.C. 154(b) by 272 days.

(21) Appl. No.: 14/777,801

(22) PCT Filed: Mar. 10, 2014

(86) PCT No.: PCT/IB2014/059570
§ 371 (c)(1),
(2) Date: Sep. 17, 2015

(87) PCT Pub. No.: WO2014/147510
PCT Pub. Date: Sep. 25, 2014

(65) Prior Publication Data
US 2016/0286627 A1 Sep. 29, 2016

Related U.S. Application Data

(60) Provisional application No. 61/802,911, filed on Mar. 18, 2013, provisional application No. 61/883,470, filed on Sep. 27, 2013.

(51) Int. Cl.
*H05B 37/02* (2006.01)
*F21S 8/08* (2006.01)
(Continued)

(52) U.S. Cl.
CPC .......... *H05B 37/0236* (2013.01); *F21S 8/086* (2013.01); *H05B 33/0845* (2013.01);
(Continued)

(58) Field of Classification Search
CPC ................. H05B 37/02; H05B 37/0209; H05B 37/0218; H05B 37/0227; H05B 37/0236;
(Continued)

(56) References Cited

U.S. PATENT DOCUMENTS 5,852,243 A * 12/1998 Chang ................. B60R 16/0237
73/659
6,036,209 A 3/2000 Tsumura
(Continued)

FOREIGN PATENT DOCUMENTS

JP 2009110140 A 10/2007
JP 2012021883 A 2/2012
(Continued)

OTHER PUBLICATIONS

White Paper, "Intelligent Street Lighting", 2009.

*Primary Examiner* — Jason Crawford

(57) ABSTRACT

The invention provides a light management information system for an outdoor lighting network system, having a
(Continued)

plurality of outdoor light units each including at least one sensor type, where each of the light units communicates with at least one other light unit, at least one user input/output device in communication with at one or more of said outdoor light units, a central management system in communication with light units, said central management system sends control commands and/or information to one or more of said outdoor light units, in response to received outdoor light unit status/sensor information from one or more of said outdoor light units or received user information requests from said user input/output device, a resource server in communication with said central management system, wherein the central management system uses the light unit status/sensor information and resources from the resource server to provide information to the user input/output device and/or reconfigure one or more of the lights units.

10 Claims, 18 Drawing Sheets

(51) Int. Cl.
  *H05B 33/08* (2006.01)
  *F21W 131/103* (2006.01)
  *F21Y 101/00* (2016.01)
(52) U.S. Cl.
  CPC ..... *H05B 33/0857* (2013.01); *H05B 37/0227* (2013.01); *H05B 37/0245* (2013.01); *H05B 37/0272* (2013.01); *F21W 2131/103* (2013.01); *F21Y 2101/00* (2013.01)
(58) Field of Classification Search
  CPC ... H05B 37/0245; H05B 37/0272; F21S 8/08; F21S 8/085; F21S 8/086; F21S 8/088
  See application file for complete search history.

(56) References Cited

U.S. PATENT DOCUMENTS

| | | | | |
|---|---|---|---|---|
| 8,278,845 B1* | 10/2012 | Woytowitz | ......... | H05B 37/0263 307/1 |
| 8,588,830 B2* | 11/2013 | Myer | ........................ | F21S 2/00 455/507 |
| 8,989,920 B2* | 3/2015 | Breed | .............. | G08G 1/096716 701/2 |
| 9,907,147 B2* | 2/2018 | Chen | ................... | H05B 37/0272 |
| 9,997,068 B2* | 6/2018 | Breed | .............. | G08G 1/096758 |
| 2009/0326991 A1 | 12/2009 | Wei | | |
| 2010/0277344 A1 | 11/2010 | Jacobs | | |
| 2012/0038490 A1* | 2/2012 | Verfuerth | ........... | H05B 37/0272 340/910 |
| 2012/0062123 A1* | 3/2012 | Jarrell | ................ | H05B 37/0245 315/131 |
| 2012/0310703 A1* | 12/2012 | Cavalcanti | ......... | G06Q 30/0201 705/7.29 |
| 2013/0009569 A1* | 1/2013 | Knibbe | .............. | H05B 37/0227 315/297 |
| 2013/0181614 A1* | 7/2013 | Agrawal | ................ | H05B 37/03 315/153 |
| 2014/0117852 A1* | 5/2014 | Zhai | .................... | H05B 37/0245 315/86 |
| 2015/0264776 A1* | 9/2015 | Amarin | ............. | G06Q 10/0875 315/129 |

FOREIGN PATENT DOCUMENTS

| | | |
|---|---|---|
| KR | 2009064926 A | 12/2007 |
| WO | 2011112506 A2 | 9/2011 |
| WO | 2012090113 A1 | 7/2012 |
| WO | 2012143814 A1 | 10/2012 |
| WO | 2012172470 A1 | 12/2012 |

* cited by examiner

METHODS AND APPARATUS FOR INFORMATION MANAGEMENT AND CONTROL OF OUTDOOR LIGHTING NETWORKS

CROSS-REFERENCE TO PRIOR APPLICATIONS

This application is the U.S. National Phase application under 35 U.S.C. § 371 of International Application No. PCT/IB2014/059570, filed on Mar. 10, 2014, which claims the benefit of U.S. Provisional Patent Application No. 61/802,911, filed on Mar. 18, 2013 and U.S. Provisional Patent Application No. 61/883,470, filed on Sep. 27, 2013. These applications are hereby incorporated by reference herein.

The present invention is directed generally to lighting control/management of outdoor lighting networks (OLNs) as well as information management using an outdoor lighting network. More particularly, various inventive methods and apparatus disclosed herein relate to integrated management of multiple unique lighting networks for integrating illumination with data manipulation and transmission functions for lighting devices and network devices, as well as methods for using the foregoing. The lighting network includes an array of outdoor light units or other electronic devices, and a network apparatus, hardware, and software for monitoring and managing the array, and/or analyzing information gathered from the array for targeted information dissemination to users and customers, as well as enabling new services and features.

New generation lights for example LEDs have the capability to adjust dimming level, color, direction (e.g., by tilting LED panels or digitally forming LED light beams), and/or harvesting various energy sources (e.g., solar/wind power). The new generation of light sources also frees the design of light units and fixtures to provide more choices for customers. Recent advances in LED technology have provided efficient and robust full-spectrum lighting sources that enable a variety of lighting effects in many applications. Some of the fixtures embodying these sources feature a lighting module, including one or more LEDs capable of producing different colors, e.g. red, green, and blue, as well as a controller for independently controlling the output of the LEDs in order to generate a variety of colors and color-changing lighting effects. In other words, the outdoor lighting network becomes more and more heterogeneous. Some of the fixtures may also include a variety of sensors (e.g. light, motion, cameras, etc.), which can be used in many ways to control lights and provide information about the environment. This allows additional flexibility in saving energy, reducing light pollution, and complying with local lighting regulations as well as providing new services to customers.

Outdoor lights, such as lighting for roadways, streets, parking facilities, parks, landscapes, footpaths, tunnels and bicycle paths, are normally managed by a single authority. For example, street lights in New York City are managed by the Department of Transportation. Central control and management by one authority allows better security, better coordination of use, and reduced maintenance cost. Most outdoor lights currently operate independently or in small groups supplied from a common power source. However, with the rise of the Internet and wireless communication systems, there is a trend toward networking of outdoor lights and managing operation of the outdoor lights through a centralized and remote server.

Systems have been introduced for the management of an outdoor lighting network (OLN). For example, lighting units of an OLN may be remotely managed to provide control over lighting behavior (e.g., scheduling of the on/off times of the lighting units and/or setting dimming levels of the lighting units) and/or to monitor lighting unit characteristics (e.g., light source status, energy consumption, lighting unit specifications). Management of outdoor lighting networks may provide one or more benefits to customers (e.g., municipalities) such as energy savings, reduced maintenance costs, and/or reduced lighting pollution, etc.

OLNs often utilize proprietary control and/or communication protocols that are not open to other device suppliers. Although the underlying connectivity technologies used in certain OLN implementations may be standard (e.g., certain wireless and/or power-line communications standards), the control and/or communication protocols are often proprietary. Other systems have been developed to fully control and communication protocol between a single CMS and each of a plurality of proprietary OLN implementations.

In addition, the current practices of lighting infrastructure renovation projects as well as new constructions include several steps: design/planning, project management/installation, operation and management as shown in upper portion of FIG. 1A. Typically, each step is provided or executed by different entities/individuals (e.g. lighting designer, vendor, contractors, facility manager, etc.). Different supporting tools and platforms are used, which are not connected nor exchange information in any way to optimize/streamline the overall process. In many projects, lighting design/planning is not linked or do not take into account all technology options available from multiple vendors. The customization of products for specific projects is not explored. Moreover, the operation/management tools are completely independent of the design/planning tools used in the early stage.

Cities are facing increasing budgetary pressures and need to be convinced of the true value and future potential of upgrading the lighting infrastructure. Increasing energy prices gives some motivation to upgrade to energy efficient LED lighting, but is not enough in some cases to justify adoption of intelligent control systems.

Currently, lighting renovation (or new construction) project design/planning does not take into account all options and potential benefits of available technologies. Also, existing tools and software packages do not consider integrated solutions (e.g. including luminaires and controls). On the other hand, the range of technology and product options is quite large and the customers are usually confused and do not see the total value of intelligent solutions. Therefore there is a need for tools that will integrate the value chain and help show customers the benefits of upgrading the lighting infrastructure and installing intelligent control systems.

The state-of-the-art outdoor lighting remote management software platforms provide control and asset management capabilities to end users, but they cover only part of the value chain. Condition assessment, design/planning, regulation compliance, and system optimization are not supported. The proposed lighting service platform, as shown in the lower portion of FIG. 1A, integrates these capabilities to enable an integrated and streamlined approach to infrastructure renovation. The platform will provide an integrated and better way to working with the customer (e.g. government entities, towns, cities, etc.) from early idea conception and planning stages to building custom solutions and operating/managing the infrastructure while clearly demonstrating the benefits of the available products and technologies.

The present disclosure is directed to inventive methods and apparatus for management (including design & planning, project management, operation & maintenance & upgrade, use and information exchange) of outdoor lighting networks. The invention is a system comprising an outdoor lighting network (OLN) including an array of outdoor light units, sensors and/or other integrated or connected electrical devices (hereinafter referred to as "light units"), a central management system (CMS), a wired/wireless network, including software, firmware, for monitoring and managing the OLN, as well as information management via the OLN. The OLN comprises multiple outdoor light units that may operate mainly in an independent mode where dimming, sensing, communication, and control processes take place between the various light units. Further communication and control may be provided between the light units and a CMS, for example, (user) information requests/exchanges, light unit failure reporting or event reporting (e.g. traffic, road hazards, etc.). The system may be tied to the Internet for dissemination of data and/or data analysis gathered by means of multiple light units or the dissemination of data through the light units to users by means of elements integrated into the light units or communication messages transmitted/received with users via user devices, for example smart phones. The light units and CMS communication may be adapted for energy-saving processes; powered-receiving from or power-providing to the grid, renewable power production and storage; and/or to Wi-Fi hot spots, cellular communication, public safety alarms, information or advertising to the public or information/analysis to customers.

The invention provides for the intelligent monitoring, control and management of outdoor lighting networks and enables new services and features for customers. The invention provides a light management system for an outdoor lighting network (OLN) having a plurality of light units, the system including a central management system (CMS) and a communication system/network operably connecting the central management system (CMS) and the light units. The central management system (CMS) is operable to: receive and process light unit information, requests for information (e.g. users, light units); determine objectives/constraints information; identify the lighting units operably connected to the plurality of light unit control apparatus associated with the requests for information; determine/update at least one of the lighting requirements, the luminance model, and the cost model; coordinate the operation of the identified lighting units as a function of the objectives/constraints, and send operation instructions to the plurality of lighting control apparatus to direct the identified light units to operate in accordance with the operation and thereby enable new services and features for user/customers.

For example, location based services (LBS) are highly popular nowadays. A location-based service can be defined as an information or entertainment service, which is accessible with mobile devices through the OLN and which uses information on the geographical position of the mobile device. Advertising is one of the main applications taking advantage of LBS. The present invention makes use of the OLNs in and around cities and buildings to collect very precise traffic information. Furthermore, via sensors, it is possible to monitor the flow of people, and even distinguish the type of traffic (cars, bikes, pedestrians . . . ) as well as to measure environmental conditions, such as pollution, noise, or temperature. The present invention thus collects time sensitive data related to various conditions associated with a given area that would impact advertising performance.

Another aspect of the invention provides a CMS to an outdoor lighting network (OLN), the CMS includes a processor; a memory operably connected to the processor; and a communication module operably connected to the processor for communication with the outdoor lighting network. The processor is operable to: receive data (e.g. sensing, etc.) from the lighting units and determine various conditions including: traffic, weather, road, lighting, compliance with legal regulations, public safety/security; receive information requests; receive objectives/constraints; identify lighting units associated with the request; determine whether at least one of lighting requirements, luminance model, and cost model have changed; update at least one of the lighting requirements; coordinate operation of the identified light units as a function of the objectives/constraints, the lighting requirements, the luminance model, and the cost model; and direct the identified lighting units to operate in accordance with the desired operation.

Another aspect of the invention provides a light unit in the OLN connected to a CMS, the light unit includes a processor; a memory operably connected to the processor; a sensing unit, and a communication module operably connected to the processor for communication with the CMS and other lighting units. The sensor can be any sensor for sensing any environmental condition, ranging from any electromagnetic signals to acoustic signals to biological or chemical signals to other signals. The processor is operable to: receive sensing data and determine various conditions including traffic/weather/road/lighting conditions/public safety/security, etc. with or without the CMS; generate an information request; transmit the request through the communication module to the central control apparatus; receive an operation instruction for operation of the light unit through the communication module from the CMS; and direct the light unit to operate in accordance with the operation instruction.

Another aspect of the invention enables streamlining design, deployment, operation and customization of lighting infrastructure with a single/integrated platform will improve efficiency and cost effectiveness of the service cycle, increase project close rate and facilitate the gradual expansion of the service into new and retrofit areas. Moreover, an integrated service platform is essential to continuously optimize the design and operation by taking into account not only luminaire specifications, but also the availability of controls solutions and their economic impact, as well as real data from existing deployments in order to optimize operation/configuration of existing and systems. Another aspect of the platform is to provide visualization for the overall solutions across a deployment area (from a specific area of interest for a project to the whole city). The visualization can be based on different aspects of the multiple solutions considered for a project (e.g. economic, energy, safety . . . ).

The invention provides a light management system for an outdoor lighting network system having a plurality of outdoor light units each including at least one sensor type, where each of the light units communicates with at least one other light unit, at least one user input/output device in communication with at one or more of said outdoor light units, a central management system in communication with light units, said central management system sends control commands to one or more of said outdoor light units, in response to received outdoor light unit status/sensor information from one or more of said outdoor light units, a resource server in communication with said central management system, wherein the central management system uses the light unit status/sensor information and resources from the resource server to determine an event occurrence, and in response reconfigure one or more of the lights units, provide information to the at least one user input/output device or initiate a predetermined action.

The foregoing and other features and advantages of the invention will become further apparent from the following detailed description of the presently preferred embodiments, read in conjunction with the accompanying drawings. The detailed description and drawings are merely illustrative of the invention, rather than limiting the scope of the invention being defined by the appended claims and equivalents thereof.

The following are descriptions of illustrative embodiments that when taken in conjunction with the following drawings will demonstrate the above noted features and advantages, as well as further ones. In the following description, for purposes of explanation rather than limitation, illustrative details are set forth such as architecture, interfaces, techniques, element attributes, etc. However, it will be apparent to those of ordinary skill in the art that other embodiments that depart from these details would still be understood to be within the scope of the appended claims. Moreover, for the purpose of clarity, detailed descriptions of well-known devices, circuits, tools, techniques, and methods are omitted so as not to obscure the description of the present system. It should be expressly understood that the drawings are included for illustrative purposes and do not represent the scope of the present system. In the accompanying drawings, like reference numbers in different drawings may designate similar elements. Also, the drawing figures are not necessarily to scale, emphasis instead generally being placed upon illustrating the principles of the invention.

FIG. 2b is a perspective view of an illumination pattern of the lighting unit in the lighting system of FIG. 2a;

FIG. 2c is a perspective view of an illumination pattern of the lighting unit in the lighting system of FIG. 2a;

FIG. 2d is a perspective view of an illumination pattern of the lighting unit in the lighting system of FIG. 2a;

FIG. 2e is a perspective view of an illumination pattern of the lighting unit in the lighting system of FIG. 2a;

FIG. 2f is a perspective view of an illumination pattern of the lighting unit in the lighting system of FIG. 2a;

Figure 1A:
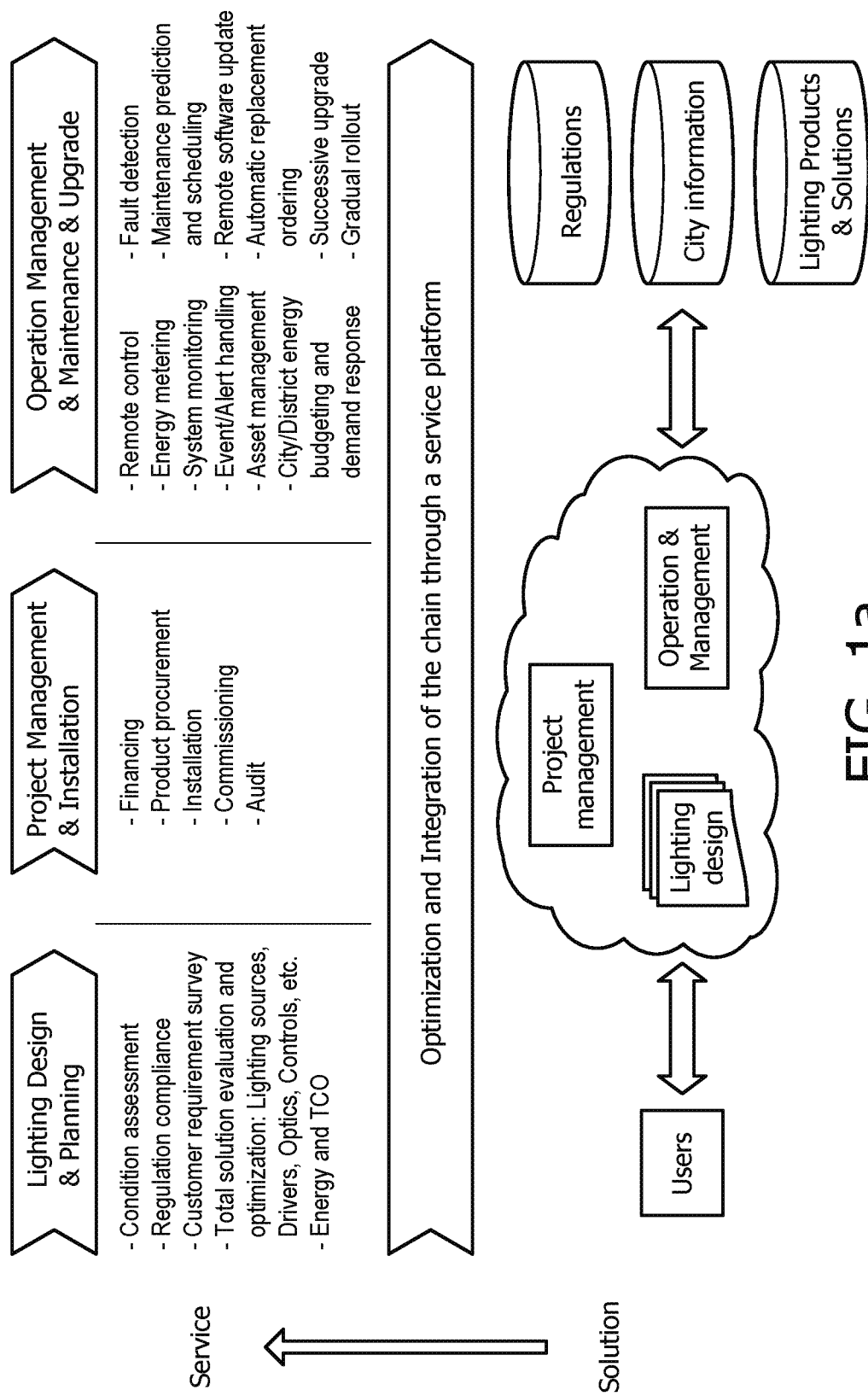
FIG. 1A illustrates the lighting infrastructure project steps.

As used herein for purposes of the present disclosure, the term "LED" should be understood to include any electroluminescent diode or other type of carrier injection/junction-based system that is capable of generating radiation in response to an electric signal. Thus, the term LED includes, but is not limited to, various semiconductor-based structures that emit light in response to current, light emitting polymers, organic light emitting diodes (OLEDs), electroluminescent strips, and the like. In particular, the term LED refers to light emitting diodes of all types (including semi-conductor and organic light emitting diodes) that may be configured to generate radiation in one or more of the infrared spectrum, ultraviolet spectrum, and various portions of the visible spectrum (generally including radiation wavelengths from approximately 400 nanometers to approximately 700 nanometers). Some examples of LEDs include, but are not limited to, various types of infrared LEDs, ultraviolet LEDs, red LEDs, blue LEDs, green LEDs, yellow LEDs, amber LEDs, orange LEDs, and white LEDs. It also should be appreciated that LEDs may be configured and/or controlled to generate radiation having various bandwidths (e.g., full widths at half maximum, or FWHM) for a given spectrum (e.g., narrow bandwidth, broad bandwidth), and a variety of dominant wavelengths within a given general color categorization.

For example, one implementation of an LED configured to generate essentially white light (e.g., a white LED) may include a number of dies which respectively emit different spectra of electroluminescence that, in combination, mix to form essentially white light. In another implementation, a white light LED may be associated with a phosphor material that converts electroluminescence having a first spectrum to a different second spectrum. In one example of this implementation, electroluminescence having a relatively short wavelength and narrow bandwidth spectrum "pumps" the phosphor material, which in turn radiates longer wavelength radiation having a somewhat broader spectrum.

It should also be understood that the term LED does not limit the physical and/or electrical package type of an LED. For example, as discussed above, an LED may refer to a single light emitting device having multiple dies that are configured to respectively emit different spectra of radiation (e.g., that may or may not be individually controllable). Also, an LED may be associated with a phosphor that is considered as an integral part of the LED (e.g., some types of white LEDs). In general, the term LED may refer to packaged LEDs, non-packaged LEDs, surface mount LEDs, chip-on-board LEDs, T-package mount LEDs, radial package LEDs, power package LEDs, LEDs including some type of encasement and/or optical element (e.g., a diffusing lens), etc.

It should also be understood that the sensors of the sensing unit can be any sensor for sensing any environmental condition, ranging from any electromagnetic signals to acoustic signals to biological or chemical signals to other signals. Examples include an IR detector, a camera, a motion detector, an ozone detector, a carbon monoxide detector, other chemical detectors, a proximity detector, a photovoltaic sensor, a photoconductive sensor, a photodiode, a phototransistor, a photo emissive sensor, a photo electromagnetic sensor, a microwave receiver, a UV sensor, a magnetic sensor, a magneto resistive sensor, and a position sensor.

The sensors can be sensitive to temperature. For example, the sensor might be a thermocouple, a thermistor, a radiation pyrometer, a radiation thermometer, a fiber optic temperature sensor, a semiconductor temperature sensor, and a resistance temperature detector. The sensor might also be sensitive to sound, e.g., a microphone, a piezoelectric material, or an ultrasonic sensor. The sensor might be sensitive to vibrations, humidity, or concentration of a vapor, particulate or gas.

The invention is not limited to any particular method for receiving data. The methods include various steps, such as providing a substrate carrying a plurality of electrical connections coupled to a power adapter, providing a lighting element coupled to an electrical connection, providing a sensor, providing a processor coupled to an electrical connection and to the sensor, receiving a stimulus with the sensor, and transmitting signals representative of the stimulus from the sensor to the processor. In embodiments, the method may include sending instructions to an actuator to alter the position of the lighting element.

The invention is not limited to any particular method for transmitting data. The methods may include providing a substrate carrying a plurality of electrical connections coupled to a power adapter, a lighting element coupled to an electrical connection, a signal unit for emitting a signal, and a processor coupled to an electrical connection and to the signal unit, and transmitting signal instructions from the processor to the signal unit.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

Embodiments of the present system may interface with conventional lighting infrastructures such as urban walkway, street, and/or highway lighting systems to control one or more portions of conventional lighting systems. Further, embodiments of the present system may incorporate automatic information retrieval for weather, traffic detection techniques, legal regulation, public safety/security information to determine one or more lighting settings and/or to control and/or configure lighting systems in accordance with the determined one or more lighting settings. Embodiments of the present system may obtain traffic/weather/road/public safety/security related information such as past and/or current conditions and/or forecasts, via any suitable network or networks (e.g., the Internet, a telephony network, a wide area network (WAN), a local area network (LAN), a proprietary network, a wireless fidelity (WiFi™) network, a Bluetooth™ network, a peer-to-peer (P2P) network, etc.) and determine one or more lighting settings or system configurations in accordance with the past, current, and/or future conditions. Further, the one or more determined system or lighting settings or related information may be based at least in part upon sensor information obtained from sensors of the system such as optical sensors (e.g., image capture devices such as cameras, etc.), radar-based (e.g., Doppler effect) sensors, rain sensors (resistance based, etc.), location sensors (e.g., GPS, predetermined, etc.), temperature sensors (e.g., thermocouples, infrared (IR), bimetallic, mercury, etc.), etc., which may be located in one or more locations such as light units, light units, etc., in accordance with embodiments of the present system. For example, one or more sensors may be incorporated into outdoor light units and may provide sensor information to the system using any suitable communication method. Although only a limited number of sensors are shown for example in FIGS. 1 & 2, other sensors are also envisioned such as satellite image sensors which may provide images of geography, atmospheric temperature, cloud cover, precipitation, etc.

In accordance with embodiments of the present system, the sensors may provide sensor information which may be processed to determine or forecast information, power availability, lighting settings, power settings, system settings, color temperature, etc. For example, Doppler Effect radar sensors may provide information on an amount of precipitation that is currently falling. Further, optical sensors may capture image information which may be processed using a suitable image processing technique to determine, for example, current weather conditions such as whether rain, hail, or snow is falling and/or if clouds are present. The image information may be further processed to determine conditions in the vicinity of the sensor such as ground conditions (e.g., snow on ground, ground wet, ground clear, foreign objects (e.g., rocks) on ground, tree branches or fallen trees, etc.), as well as current illumination conditions (e.g., sunny, dark, sufficient lighting, insufficient lighting, etc.) in the vicinity of a corresponding sensor.

In accordance with embodiments of the present system, numerous sensing modalities (e.g., sensor types) may be provided to provide sensing information. The sensors may be utilized to provide sensing information for example to determine or forecast information and/or may also be utilized to adjust/correct sensing information. For example, depending on the sensing modality, particular traffic/weather/road conditions may or may not influence sensing performance of one or more sensors. In accordance with embodiments of the present system, for a case wherein one or more of the system sensors is an image sensor, the one or more sensors may be affected by conditions such as rain, wind, snow, time of day/month/year, etc. In these embodiments, knowledge about such conditions such as provided by a sensor and/or other information source may help in more robust sensing. For example, in accordance with a particular traffic/weather/road forecast a specific set of image acquisition parameters and/or detection algorithm settings may be provided to one or more sensors for each such condition. For example, in the case of strong rain, a detection threshold for an imaging sensor may be increased to avoid false triggers due to, for example, a rain drop moving in front of the sensor. As may be readily appreciated by a person of ordinary skill in the art, a similar type of adaptation may be applied to a given sensing modality.

In accordance with embodiments of the present system, a lighting system may be provided which obtains various sensor information such as traffic/weather/road information, image information, etc., which is processed to determine particular event conditions and/or lighting conditions in the vicinity of a corresponding sensor at one or more times or periods. For example, the sensors may be used to collected data in public spaces, such as retail stores, convention halls, public streets, sports venues, entertainment spots, etc., to monitor the flow of people, vehicles, or other objects and determine the number of people or objects which pass by the unit, the speed at which the people or objects pass the unit, or any other suitable measurement. The collected data may then be analyzed to determine traffic flow, traffic patterns, points of congestion, etc. This analysis may be useful, for example, to determine points where traffic is congested, to help identify a change in the lighting layout or a lighting configuration that may help redirect traffic flow or ease passage and congestion, etc. Thus, an illumination and/or power setting for selected light units are determined in accordance with the determined conditions and/or lighting conditions. In accordance with embodiments of the present system there is provided a control system which may set an illumination configuration of a first light unit in accordance with sensory information received from a second light unit. Thus, for example, if the sensor information from the second light unit indicates a dangerous condition (e.g., a hazard on a path such as a foreign object, a vehicular accident, ice, etc.), the system may set an illumination configuration including one or more of an illumination pattern (e.g., a shape of an illuminated area), illumination intensity (e.g., brightness), illumination spectrum (e.g., color), illumination polarization, illumination frequency, etc., of the first light unit in accordance with the sensor information received from the second light unit.

Figure 1B:
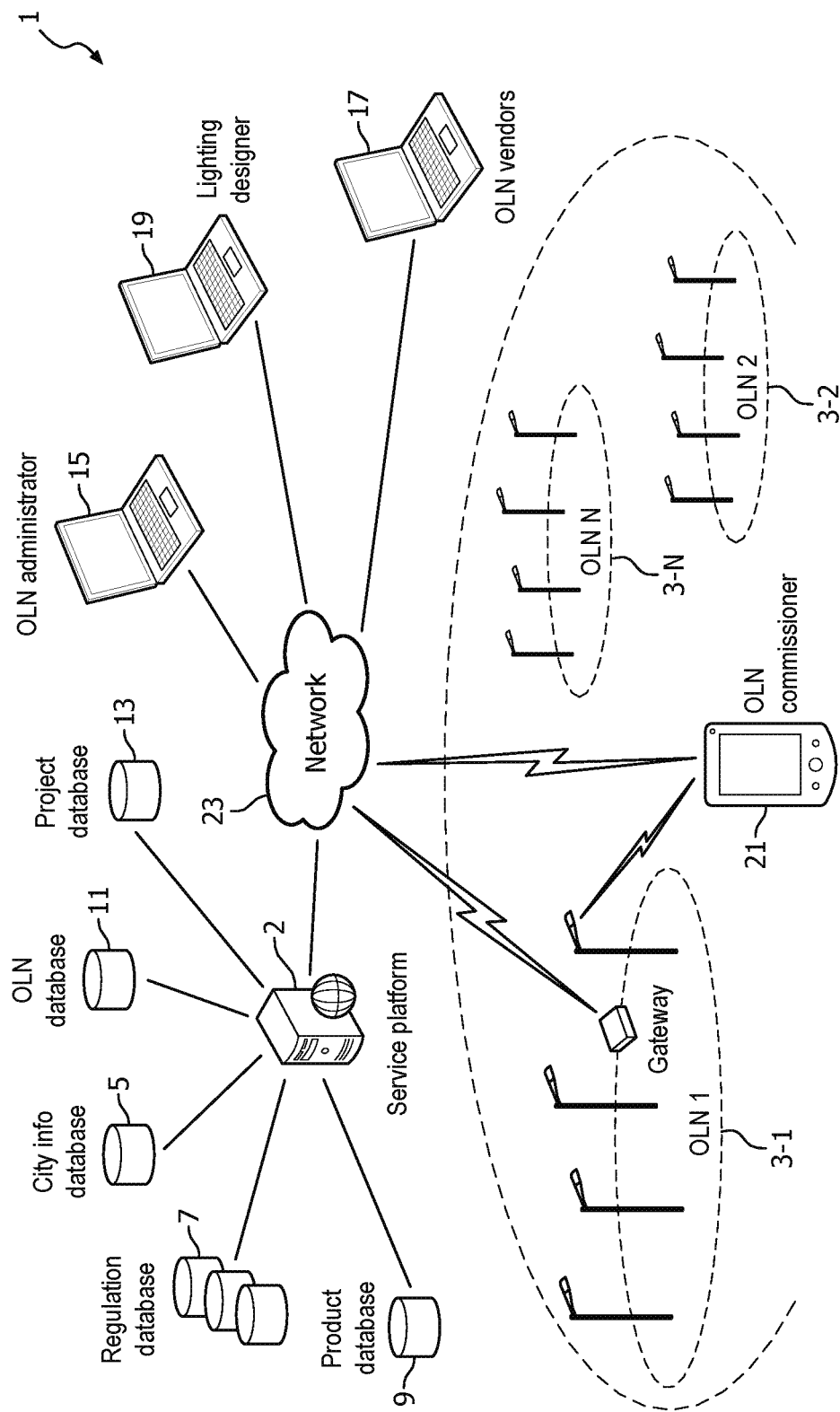
FIG. 1B is a perspective view of the lighting platform for the design, deployment, operation and customization of lighting infrastructure.

FIG. 1B shows an example of lighting system service architecture 1 in accordance with the present invention. Outdoor lighting networks (OLNs) 3-1 to 3-N may be gradually installed and connected to the service platform server 2. OLNs 3-N are not necessarily available in the initial stages in many areas. The service platform server 2, as described further below, especially the assessment module will provide the initial input to enable the design/plan that can lead to installation of solutions, such as OLNs 3-N. But other solutions, including simpler technologies (e.g. luminaire replacement), may also be recommended/selected for a given area.

The service platform server 2 may be implemented as a central or distributed computing service (e.g. cloud service) that connects to several databases or information systems that provides/stores different types of information, in particular: City information database 5 stores/provides records of assets installed and associated attributes (location, type, installation data, manufacturer . . . ) as well as data collected from field devices (such as any type of sensing data, such as traffic, environment, weather, etc.); Regulation databases 7 store/provide information about applicable standards and regulations to a specific area. Multiple databases may exist at different hierarchical levels, such as city, state, national; Product databases 9 store/provide information about products, potentially from multiple vendors/manufactures, and their associated capabilities/features, including technical specification and economics data (e.g. cost); OLN database 11 stores/provides information about installed systems (OLNs) including the many components and connected devices that form an OLN; Project database 13 stores/provides information related to projects performed through the service platform server 2 for specific areas/users. Projects may be at different stages in their life cycle, from planning, installing, to operation & management. The project database may also include information about past projects, potential future projects, or "virtual" projects, which do not include actual installation of systems. Illustratively, the service platform server 2 may include a CPU, memory, communication interfaces, and operating system, such as Linux, a Web Server, such as Apache, scripting engine, such as PHP/Perl/Python, and MySQL, as well as the Application Processing units described in FIG. 5.

The database shall be understood in a generic sense, and it could be any form of information source, such as city information database 5 could be a Web service data source provided by a city management system, OLN database 11 could be provided by a vendor specific interface of a proprietary OLN management system.

The service platform 2 may also interact with different types of users, including, but not limited to: OLN system administrators 15, facility/infrastructure managers (not shown), lighting designer 19, OLN vendors/manufacturers 17, installation contractors, commissioning engineers (not shown), etc.

The above components and entities, as well as OLN Commissioner 21 interact over the network 23. However, it is understood that this may be any suitable network or one or more networks such as a wide area network (WAN), a local area network (LAN), a telephony network, (e.g., 3G, a 4G, etc., code division multiple access (CDMA), global system for mobile (GSM) network, a plain old telephone service (POTs) network), a peer-to-peer (P2P) network, a wireless fidelity (WiFi™) network, a Bluetooth™ network, a proprietary network, the Internet, etc., to communicate data.

Figure 1C:
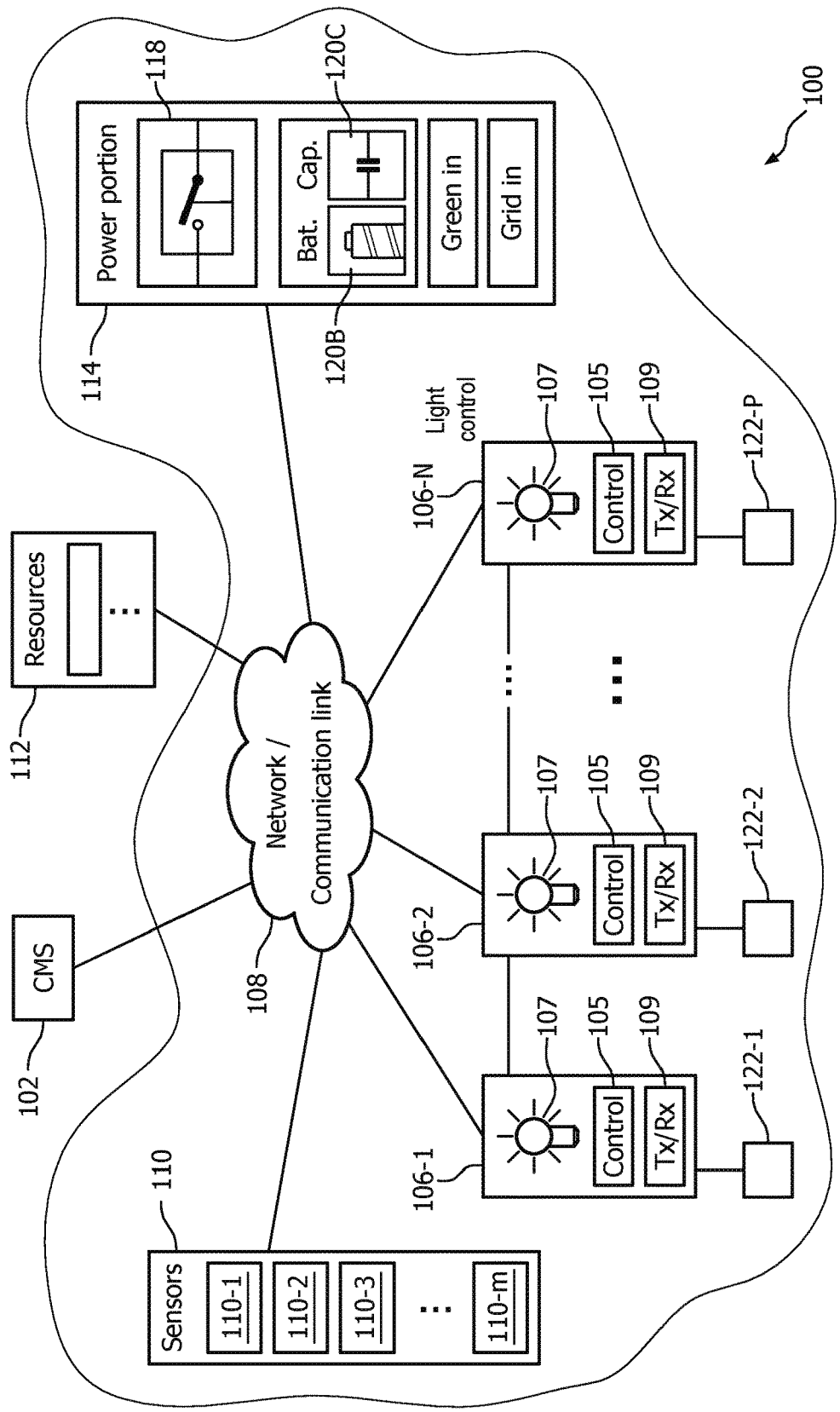
FIG. 1C is a schematic view of an outdoor lighting network (OLN) in accordance with embodiments of the present system.

FIG. 1C is a schematic view of an outdoor lighting network (OLN) 100, a central management system (CMS) 102 and an information resources server 112 (e.g. weather, traffic, public safety/security reports or other, for example news media or Internet available information), in accordance with embodiments of the present system. Although FIG. 1 shows the elements of the outdoor lighting network (OLN) 100 as discrete elements, it is noted that two or more of the elements may be integrated into one device. The outdoor lighting network (OLN) 100 includes a plurality of light units or luminaires (and/or electrical devices) 106-1 through 106-N (generally 106-N), a plurality of sensors 110-1 through 110-M (generally 110-x), a power portion 114, one or more optional user interface apparatus 122-1 through 122-N (generally 122-N) and a network/communication link 108 which, in accordance with embodiments of the present system, may operably couple two or more of the elements of the present system.

The user interface apparatus 122-1 through 122-N is accessible to the user and can be used to control the light units of the OLN through the CMS by providing lighting requirements to the CMS. The user can control the outdoor lighting network to the extent which the user is authorized. Any number of security authorizations methods may be used (including conventional security methods and ones described further below). The user interface apparatus 122-1 through 122-N can be implemented as a dedicated device or incorporated in another device. The user interface apparatus 122-1 through 122-N can be implemented in a mobile phone, PDA, computer (e.g., laptop, tablet such as an iPad), vehicles including a car, airplane, helicopter, boat, or the like, device in a vehicle, mobile GPS device, embedded device, any intelligent device/machine, a sensing device or any other device accessible to a user. The user interface apparatus 122-1 through 122-N can also be incorporated in a device which is itself a user, e.g., a security camera which needs different light levels according to the particular situation. In one example, a user control apparatus can operate independently as an autonomous device, and autonomously generate user temporary user policies without user interaction.

When the user is an intelligent device, the user interface apparatus 122-1 through 122-N can automatically generate the lighting requirements. In one embodiment, the intelligent device responds to external stimulus, such as a transponder operating independently of the user interface apparatus 122-1 through 122-N, e.g., receiving/detecting weather and roadway conditions etc., to initiate the lighting requirements or appropriate system responses, e.g. alerting sirens in response to a detected hazard such as a vehicle accident. Another example of this would be a communication device within a vehicle that alerts a local sensor external to the vehicle, and the local sensor provides external stimulus to an intelligent device of the user interface apparatus 122-1 through 122-N, which automatically generates the lighting requirements, e.g., to turn on darkened or change the color temperature light units when a vehicle/person approaches. In another embodiment, the user interface apparatus 122-1 through 122-N can include a means to detect when/where the user lighting control service is available for a given user by combining information received from the OLN with user location information. Once the service availability is detected, the user interface apparatus 122-1 through 122-N can indicate such availability to the user and enable the user input interface.

The user interface apparatus 122-1 through 122-N communicates with the OLN, using any desired technology, such as a cellular data communication protocol (e.g., GSM, CDMA, GPRS, EDGE, 3G, LTE, WiMAX,), DSRC or WiFi radio, ZigBee protocol operating on top of the IEEE 802.15.4 wireless standard, WiFi protocol under IEEE standard 802.11 (such as 802.11b/g/n), Bluetooth protocol, Bluetooth Low Energy protocol, or the like.

The user interface apparatus 122-1 through 122-N enables a user, such as a person or an intelligent device, to control certain features of an outdoor lighting network. The user interface apparatus 122-1 through 122-N also enables a user to discover (or detect) available services of the OLN and/or the availability of an OLN service at any given location and time. The user interface apparatus 122-1 through 122-N can be any type of apparatus receiving/transmitting user or OLN requirements. Examples of OLN requirements are the lighting requirements and include average light intensity, uniformity, color temperature, and/or the like for lighting units over an area, e.g., a street or park, according to factors such as traffic, weather, time of day/night, environment conditions; regulation; user input; or the like.

The CMS 102 may include one or more processors which may control the overall operation of the outdoor lighting network (OLN) 100. Accordingly, the CMS 102 may communicate with, the light units 106-N, the sensors 110-x, the power portion 114, and/or the resources server 112 to send (e.g., transmit) and/or receive various information in accordance with embodiments of the present system. For example, the CMS 102 may request (e.g., using a query or queries, etc.) sensor information from one or more of the sensors 110-x and/or other information from the resources server 112 and may receive corresponding information (e.g., results of the query, etc.) from the sensors 110-x and/or the resources which may be processed to determine lighting settings (e.g., a lighting strategy) for one or more of the light units 106-N or transmit information from one or more of the light units 106-N to a user or the CMS 102. Further, the CMS 102 may store information (e.g., historical information) which it receives and/or generates for further use such as to determine lighting and/or charging characteristics in accordance with embodiments of the present system. As new information is received by the CMS 102, the stored information may then be updated by the CMS 102. The CMS 102 may include a plurality of processors which may be located locally or remotely from each other and may communicate with each other via the network 108.

In accordance with embodiments of the present system, the CMS 102 may control the network 108, or portions thereof, to route power from selected sources such as may be available over a "grid" (e.g., a municipal electrical supply system, etc.) and/or from "green" sources (e.g., solar, hydro, chemical, hydrogen, and/or wind power sources) for immediate use and/or storage for use at a later time in accordance with a selected and projected lighting and/or power settings. In this way, embodiments of the present system may plan ahead based the past, present and future forecasted conditions and plan power distribution and generation configurations and characteristics accordingly. Thus, in a case wherein a windy evening is expected, embodiments of the present system may determine to rely upon wind power generation to power the light units so as to conserve battery power to extend the life of batteries (e.g., due to decreased cycling and/or optimizing charge rates). Thus, the system may allocate power in accordance with system settings and actual or predicted weather. Accordingly, the system may charge storage devices in accordance with system settings and/or actual or predicted weather. Further, by being able to predict illumination settings due to actual or predicted weather, the system may determine power draw due to light units and may prepare energy sources (e.g., batteries, capacitors, fuel cells, chemical cells, thermo cells, etc.) to store power based upon the actual or predicted weather.

For example, the CMS 102 may determine expected energy requirements over time (e.g., of one or more of the light units 106-N) and compare them with threshold availability requirements of a power source (e.g., a battery, the "grid," a capacitor, etc.) over time and, if it is determined that the projected energy requirements exceed the threshold availability requirements of a power source, the CMS 102 may configure the system such that other power sources may supply power. However, it is also envisioned that the CMS 102 may select power storage devices in accordance with a weight (e.g., a rank). Thus, for example green sources may be weighted higher than a conventional fossil fuel source (e.g., the "grid," etc.). Further, the CMS 102 may determine lighting settings (e.g., illumination pattern, illumination intensity, illumination spectrum, illumination polarization, illumination frequency, etc.) for a corresponding light unit 106-N and may determine energy requirements in accordance with the determined lighting configurations. Moreover, the CMS 102 may request information from the resources server 112 and may determine when to charge selected power storage devices in accordance with system settings based on received information and/or history information (e.g., demand response situation, statistical information, etc.). Accordingly, the system may include statistical and/or heuristic engines to fit data.

The network 108 may include one or more networks and may enable communication between one or more of the CMS 102, the resources server 112, the light units 106-N, the sensors 110, and/or the power portion 114, using any suitable transmission scheme such as a wired and/or wireless communication schemes. Accordingly, the network 108 may include one or more networks such as a wide area network (WAN), a local area network (LAN), a telephony network, (e.g., 3G, a 4G, etc., code division multiple access (CDMA), global system for mobile (GSM) network, a plain old telephone service (POTs) network), a peer-to-peer (P2P) network, a wireless fidelity (WiFi™) network, a Bluetooth™ network, a proprietary network, the Internet, etc. Further, the network 108 may include one or more power supply networks which may provide power to the system 100 via, for example, conventional sources (e.g., the "grid") and/or "green" sources such as solar, hydro, wind, fuel cells, chemical, thermal, battery, etc. Accordingly, the network 108 may include power switching circuitry such as may be included in the power portion 114 to switch power to/from a desired electrical destination/source.

A memory (not shown) in the OLN and CMS may include any suitable non-transitory memory and may store information used by the system such as information related to operating code, applications, settings, history, user information, account information, weather related information, system configuration information, calculations based thereon, etc. The memory may include one or more memories which may be located locally or remote from each other (e.g., a surface area network (SAN).

The resources server 112 may include other related information resources such as proprietary and/or third party news media and Internet related resources which may provide information such as public safety, security, regulatory, traffic, weather, road condition reports and/or forecasts to the CMS 102 and/or the light units 106-N. Further, the resources server 112 may include report applications to process information which may be sent to the resources server 112 such as the sensor information and/or reports and provide corresponding forecast information. Thus, the report applications may further refine a report for an area and/or time period using sensor information obtained by sensors such as the sensors 110-x.

For example, the information from Resources 112 may include traffic monitoring based on cellular telephony traffic monitoring which is widely applied for the navigation purposes. Monitoring is based on the analysis of the cellular phones switching between base stations. This combined with feedback information from the GPS receiver devices via cellular data services allows for traffic indication with relatively high geographical resolution. Details regarding this technology are well known.

Based on the cellular telephony traffic monitoring information received (e.g. transition speed between cellular telephony base stations, accompanying GPS data) a nature of the detected cellular traffic is determined (e.g. motorized, pedestrian, cycling, etc.). Furthermore, such determination can also take into account additional information, such as public transportation schedules, in-house transitions (e.g. when a cellular device switches between base stations while basically remains stationary), etc. Once traffic nature is determined, traffic intensity can be determined for each of traffic types (e.g. motorized, pedestrian, public transportation, etc.). Based on this information, relevant light levels, patterns, etc., can be determined. The monitoring may be enhanced by means of prediction rules based on actual traffic monitoring. Such prediction rules should take the following into account: Local traffic intensities as a function of time, day of week, season, etc.: typical transition paths; Local topology influencing cellular signal strengths etc.

The power portion 114 may include power sources which may include conventional (e.g., "grid" based (e.g., from a municipal power authority) or "green" (e.g., from a "green" source such as hydro, solar, wind based sources, etc.) and/or combinations thereof. Further, the "green" power may be supplied locally (e.g., from a local battery, a solar cell, etc.) or may be supplied via an electrical supply grid from one or more remote "green" sources. Accordingly, outdoor lighting network (OLN) 100 may include a plurality of "green" power generation devices such as solar cells and/or wind and/or hydrodynamic generators. Further, the power portion 114 may include active and/or passive components such as networks, switches, etc. (generally power circuitry 118), to transport and/or switch power to, or from, one or more power sources (e.g., the "grid," the battery 120B and/or capacitor storage 120C, etc.) in accordance with energy settings of the system. The energy settings of the system may be determined by the CMS 102 based upon, for example, resource information, power supply information (e.g., power blackout expected at 12:00 am, duration 3 hours, etc.), lighting settings (e.g., full, energy savings, etc.), power requirements, etc. Accordingly, the power circuitry 118 may be configured in accordance with the energy settings so as to switch power to and/or from, sources (e.g., the "grid," battery storage, solar cells, capacitors, thermal storage, chemical storage, fuel cells, etc.). Thus, the CMS 102 may configure the power portion 114 with a power setting such that a first light unit 106-1 may operate on power from the "grid," while a second light unit 106-2 may operate on battery power, while a third light unit 106-3 may operate on solar power provided by a solar cell (e.g., at a remote location), etc., as desired. Generally, the CMS 102 and/or other portions of the system (e.g., one or more of the sensors, the light units, and the power portion) may operate as a power management module. In accordance with embodiments of the present system, the power management module may determine the power required by the system at various times and thereby control power usage and/or generation to allocate power to light units, storage devices, sources, etc.

For example, the CMS 102 may query the power portion 114 for information related to power sources such as available supply (e.g., by day, date, hour, etc.), charge (e.g., 80% of 100 kiloWatt-hours (kWh)), operative state (inactive for service, operative, 50% reliable, etc.), etc. The power storage devices 120 may include power storage elements such as batteries 120B, capacitors 120C, chemical cells, fuel cells, thermal cells, etc., which may store power for later use by the outdoor lighting network (OLN) 100 and which may be located locally and/or remote from each other. For example, one or more storage elements such as batteries, capacitors, etc., may be located in one or more corresponding light units 106-N and may be selectively configured to charge and/or provide power to a selected light unit 106-N which may include the corresponding light unit 106-N and/or a different light unit 106-N. The power provided by the power portion 114 may be generated by conventional sources and/or by "green" sources and may be selectively stored, routed, and/or consumed (e.g., by selected light units, etc.) in accordance with a selected system configuration.

The sensors 110 may include a plurality of sensors types such as sensors 110-1 through 110-M (generally 110-x) which may generate sensor information based on the particular sensor type such as image information, status information (e.g., light unit operative, non-operative, etc.), radar information (e.g., Doppler information, etc.), geophysical information (e.g., geophysical coordinates obtained from, for example, a global positioning system (GPS)), pressure information, humidity information, etc. The sensors 110-x may be located at one or more geophysical locations or integrated into a light unit 106-N, and may report their location to the CMS 102. Each sensor 110-x may include a network address or other address which may be utilized to identify the sensor.

The light units 106-N may include one or more of a transmission/reception (Tx/Rx) portion 109, a control unit 105, illumination sources 107 such as lamps (e.g., a gas lamp, etc.), light emitting diodes (LEDs), incandescent lamps, fluorescent lamps, etc., and may be controlled by the control unit 105. The control unit 105 also manages the flow of information to and from the user interface apparatus 122-N in the light unit 106-N. The illumination sources may be configured in a matrix (e.g., a 10×10 matrix of illumination sources) in which illumination characteristics such as illumination pattern, intensity, spectrum (e.g., hue, color, etc.), polarization, frequency, etc., from one or more of the plurality of illumination sources and/or light pattern for a plurality of illumination sources, may be actively controlled by the system. The light units 106 may further include one or more light controlling elements within control unit 105 such as active reflector arrays to actively control illumination patterns from one or more of illumination sources of the plurality of illumination sources. For example, the one or more active reflector arrays may be electronically positioned and/or otherwise manipulated to provide (e.g., via reflection, refraction, and/or transmittance) illumination from one or more illumination sources into a desired area thus controlling an illumination pattern (e.g., controlling the shape and/or size of the illumination pattern such as is described with reference to 231-N below). Further, the one or more active reflector arrays may be electronically controlled to control an illumination intensity (e.g., in lumens) or color temperature of an illumination pattern as will be described below. Moreover, the light controlling elements 130 may include one or more active filters which may be controlled to control illumination transmission there through (e.g., via transmittance), illumination spectrum, and/or illumination polarization of illumination passing there through. Further, the controller may control illumination spectrum and/or light output (e.g., in Lm/M2) by one or more of the illumination sources. Thus, the controller may control illumination intensity by controlling the illumination output from an illumination source. Similarly, the controller may control two or more illumination sources to control an illumination pattern.

Thus, illumination characteristics such as illumination pattern, illumination intensity, illumination spectrum, illumination polarization, etc., of one or more light units may be controlled by the control unit 105 and/or by the respective light unit 106-N. Each light unit 106-N and/or groups thereof may include a network address and/or other identifying information such that transmissions from/to the light unit 106-N may be suitably directed. The light unit identifying information may further include a geophysical location.

Figure 2:
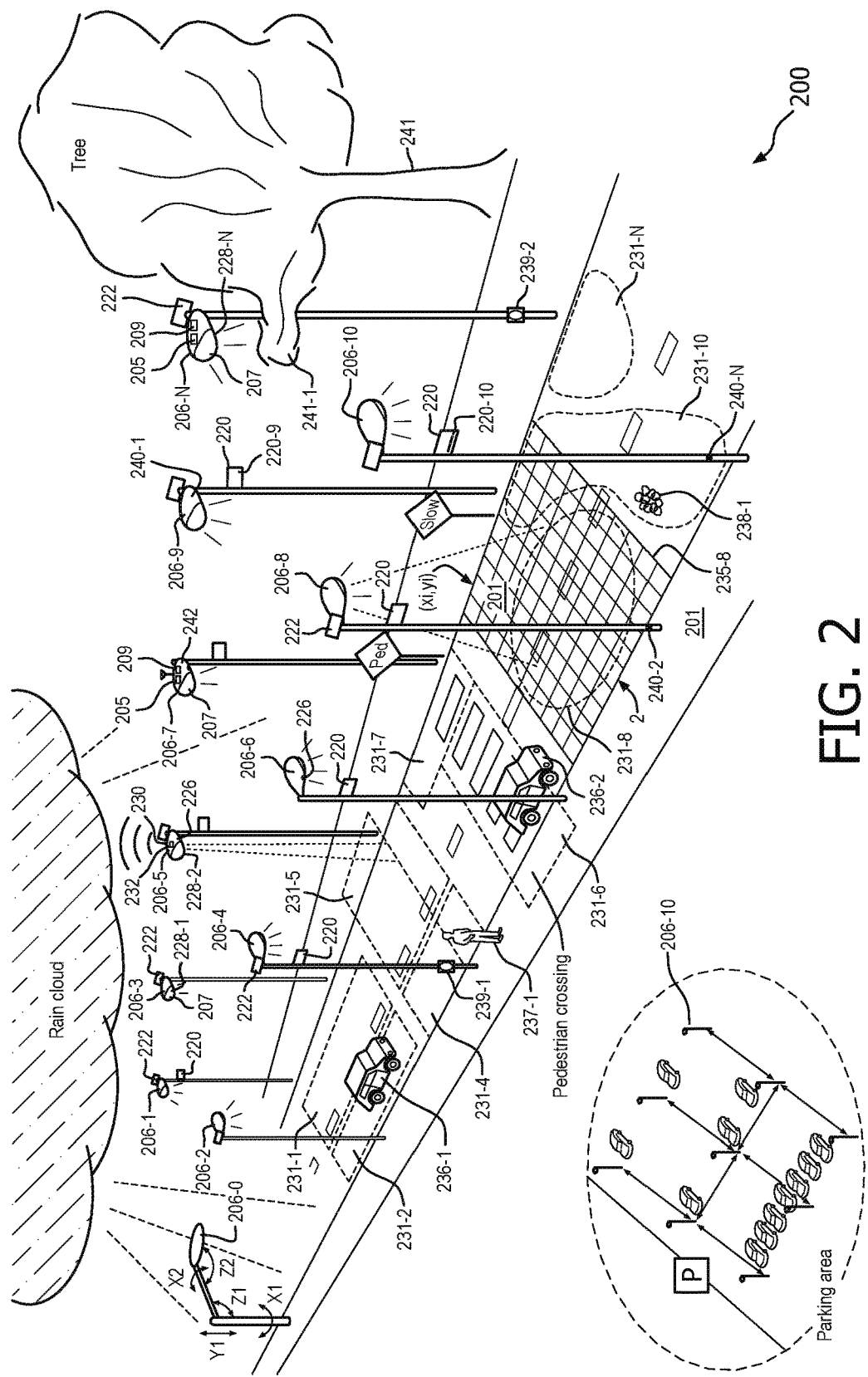
FIG. 2 is a perspective view of a lighting system in accordance with embodiments of the present system.

FIG. 2 is perspective view of a lighting system 200 (a portion of outdoor lighting network (OLN) 100) in accordance with embodiments of the present system. The lighting system 200 may be similar to the outdoor lighting network (OLN) 100 and may include a plurality of light units 206-1 through 206-N which may illuminate a surface 201 such as a street, sidewalk, park, tunnel, parking lot, etc., with a controllable illumination pattern 231-N. One or more of the light units 206-x may include one or more of an illumination source 207, a battery storage 220, a controller 205, a Tx/Rx portion 209, and an alternate energy source 222, e.g. solar cell. The illumination source 207 may include one or more lamps such as LEDs, gas lamps, fluorescent lamps, incandescent lamps, etc., which may provide illumination under the control of the controller 205. The Tx/Rx portion 209 may transmit and/or receive information such as, data (e.g. advertising, general information, selected information, etc.), sensor information, lighting setting information, power setting information, etc., to and/or from the CMS 102, other light units 206-x, a power portion, sensors, user interface apparatus122-N, or input/output devices 239, etc. The battery 220 may receive energy generated by a corresponding solar cell and may store the energy selectively for later use by one or more selected light units 206-x. Further, one or more of the light units 206-x may include input/output devices 239. The input/output devices 239 of FIG. 2 or user interface apparatus 122-1 of FIG. 1 may be coupled to light units 206-N or mobile user devices 239-N. As further shown in FIG. 2, input/output devices 239-1 may be mounted on a light unit 206-4 or vehicle 236-1. Input/output devices 239 may be any interface output device such as speakers, colored indicator lights (e.g. red/yellow/green), display panels with keyboards or touch panels etc. wherein information may be input or output, for example by users, to the lighting system 200. In particular, the display panels with keyboards or touch panels may be used to input a password or user identifier to obtain requested (personalized) information (e.g. directional path indicators, etc.). The input/output devices 239 may also be uses to control one or more lighting system 200 functionality, depending on the user's appropriate level of access. Conventional access protocols may be used. Further, one or more of the light units 206-x may include sensors 226. Sensors 226 may be any sensor as further described herein, such as an infrared (IR)/air (ambient) temperature, light, motion/traffic sensors, etc.

As shown in by light unit 206-0, CMS 102 can automatically adjust lamps' position (height and orientation) to a given lighting quality of service requirement and better address surrounding conditions that are influencing the quality of lighting as well as reduce maintenance costs. The mechanical components of the dynamic light unit positioning provides the physical movements. The control system is responsible for instructing the position of the lamp on a light pole and specifying when and how strong the lamp should light-up the area. Sending this information from the control system into the mechanical system requires the computed lamp position information to be encoded according to some protocol. The following parameters are defined as necessary to provide communication between the control unit 105 or CMS 102 and the light unit 206-0. The parameters are listed below and depicted on FIG. 2 element 206-0 and include: x1: the direction from the pole in which lamp points too; y1: the height on which a lamp is hold on the light pole; z1: the angle between the light pole and the hand holding the lamp; x2: the angle specifying how lamp is turned around the pole's hand; z2: the angle between the pole's hand and the lamp itself.

The dynamic positioning for light unit 206-0, for example, may be used to improve driving experience, improve living conditions of the surrounding environment, and to support emergency situations, including: adapting lamp position to improve aesthetic (low-height horizontally-oriented lamps during day hours, and up-height vertically-oriented lamps during night hours); venue support (parades, concerts, demonstrations, sporting events); light shows (organized light positioning creates visual effects); improving emergency response, directing light on accident scene; light tracking (intense light points on objects of interest: i.e.

privileged vehicles (police, ambulance), vehicles under surveillance, people walking in dark area (light follows people in a dark street, over a parking lot) and improve camera surveillance (lamp can be temporary positioned toward a store entrance when someone enters a store during suspicious hours).

The dynamic height adjustment has also economical factor influencing energy costs for lighting operation. In some situations is it required to provide as much lighting as possible. When this takes place, all light units 206-N are operating at 100% of their power. In other situations it is required to save energy by lowering the level of luminance to 50% of the maximum level. Using the CMS 102, all light unit 206-N can be dimmed to 50%. Using CMS 102 every second light unit 206-N can be turned-off, while other light units 206-N stay operational on 100% but are adjusted to a higher distance above the ground. Given that power saving due to turning off 50% of light units 206-N is higher than power saving due to dimming all lamps by 50%, the lamp's height adjustment might be more energy efficient than light units 206-N dimming control. Lastly, the dynamic light units 206-N height positioning creates opportunities to save funds on lighting maintenance.

Figure 2A:
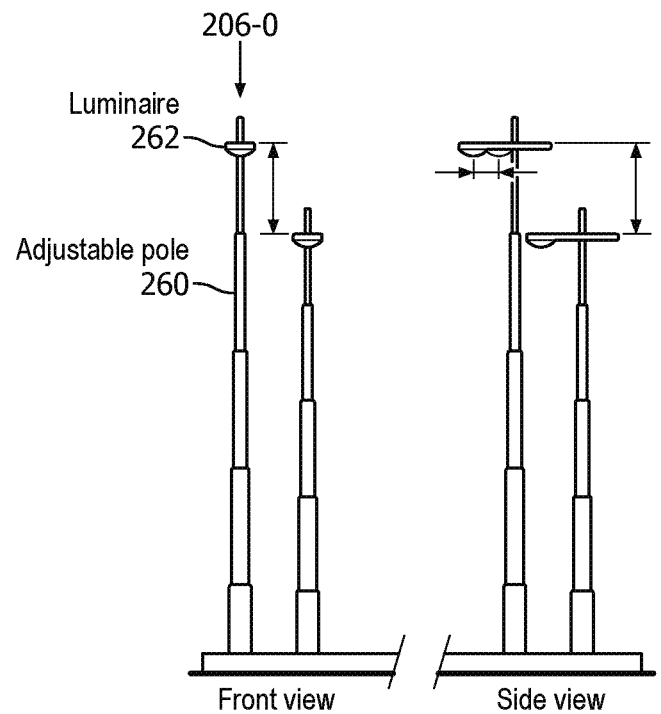
FIG. 2a is a perspective view of a lighting unit in the lighting system of FIG. 2.

Illustratively, lighting unit 206-0 includes two main parts: the pole and luminaire design and the associated control algorithm. The simplified system diagram is shown in FIG. 2a. The adjustable pole 260 has multiple sections; the diameter of the top section will be smaller than the bottom ones. The luminaire 262 can be fixed on the top section of the pole or have an adjustable orientation, as described above. A mechanical system (not shown) using such as hydraulic pressure can be applied to increase or decrease the length of the pole and adjust the orientation of the fixture. In this way, the luminaire height/orientation can be changed. Alternatively, other known mechanical engineering methods may be used. Also, the lens of lighting unit 206-0 can be also be flexible so that the user via CMS 102/control unit 105, has several options to adjust the illumination pattern 231 by changing the lens' direction and/or as further described below. Several luminaire design examples are provided to show the unique advantages of the system.

The control scheme will be outlined in the following sections, including: a) a dimming scheme to change the light brightness: b) control action to adjust the height of pole to achieve desired illumination pattern 231 or for easy maintenance; c) control action to adjust the angle of luminaire sub-panels to achieve desired illumination pattern 231, save energy with completely turning off assigned lighting units 206, share light to the sidewalk or intersection; d) control action to adjust the orientation of the luminaire 262, for example, along the beam of the pole to distribute light in a desired way or luminaire tilt, as further described below; and e) control action to achieve smooth light transition between modes, for example from normal operation to dimming mode.

Figure 2B:
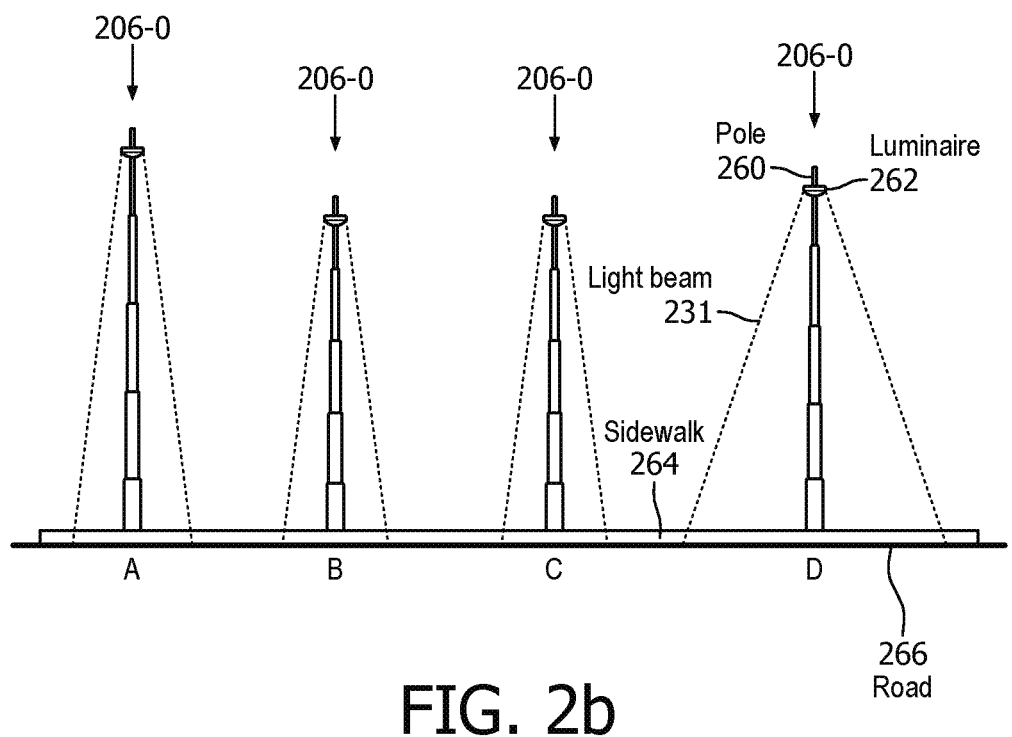

The basic control options of the system are shown in FIG. 2b. The actual control action could be the combination of these basic control actions. From (A) to (B), the pole length is adjusted such that the illumination pattern 231 is controlled (i.e. the street light in A mode will light larger area than B mode). From (B) to (C), the brightness of LED strings is adjusted (i.e. the street light in B mode is dimmed compared with C mode). From (B) to (D), multiple actions are taken in place, including 1) pole length adjustment and 2) sub-panel angle adjustment (i.e. the illumination pattern 231 area in D mode is doubled with respect to B mode).

Figure 2C:
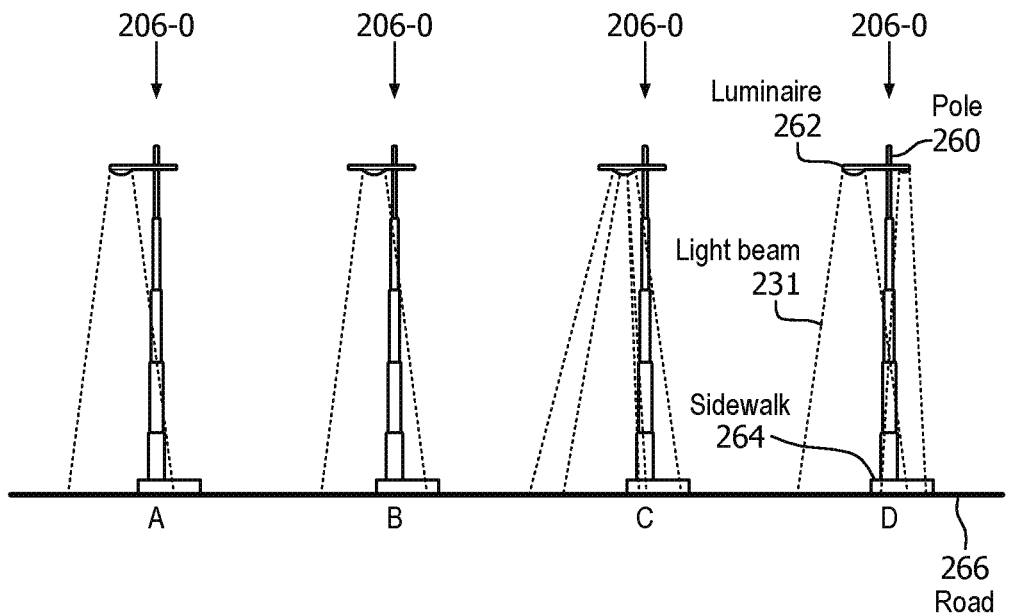

On aspect of the system is to share light to sidewalk 264 and/or intersection/road 266 is shown in FIG. 2c. Importantly, 1) the pole length can also be adjusted to illuminate the sidewalk 264 (not shown); 2) different luminaire designs may affect the actual control actions and may be used; and 3) the sidewalk 264 and intersection illumination pattern 231 pattern can be specifically controlled based on the same hardware setup. From (A) to (B), the luminaire 262 will be moved towards the sidewalk side so that more light will be distributed to sidewalk 264. From (A) to (C), particular sub-panel(s) of the luminaire 262 will be under angle adjustment to widen the illumination pattern 231 region, as shown in (C). In (D) another luminaire design is suitable for this purpose, in which a separate LED string/panel and/or lens is provided.

Figure 2D:
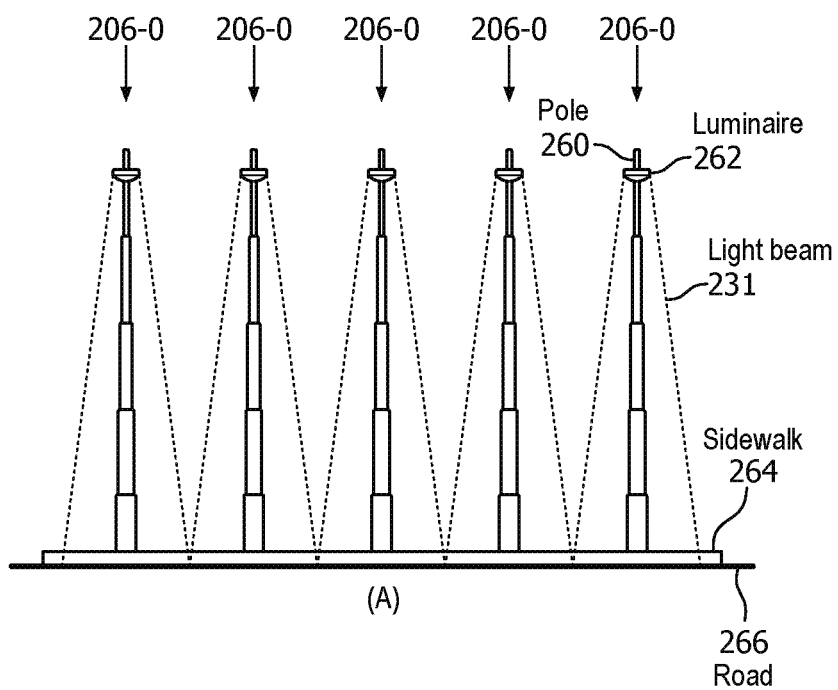
Figure 2E:
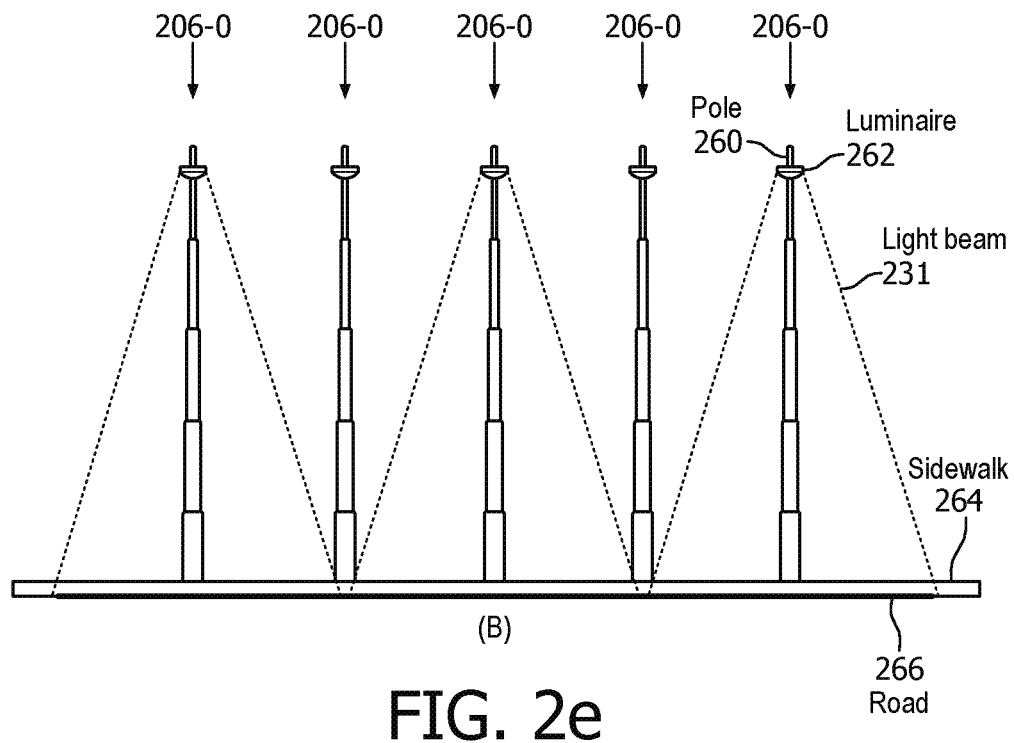
Figure 2F:
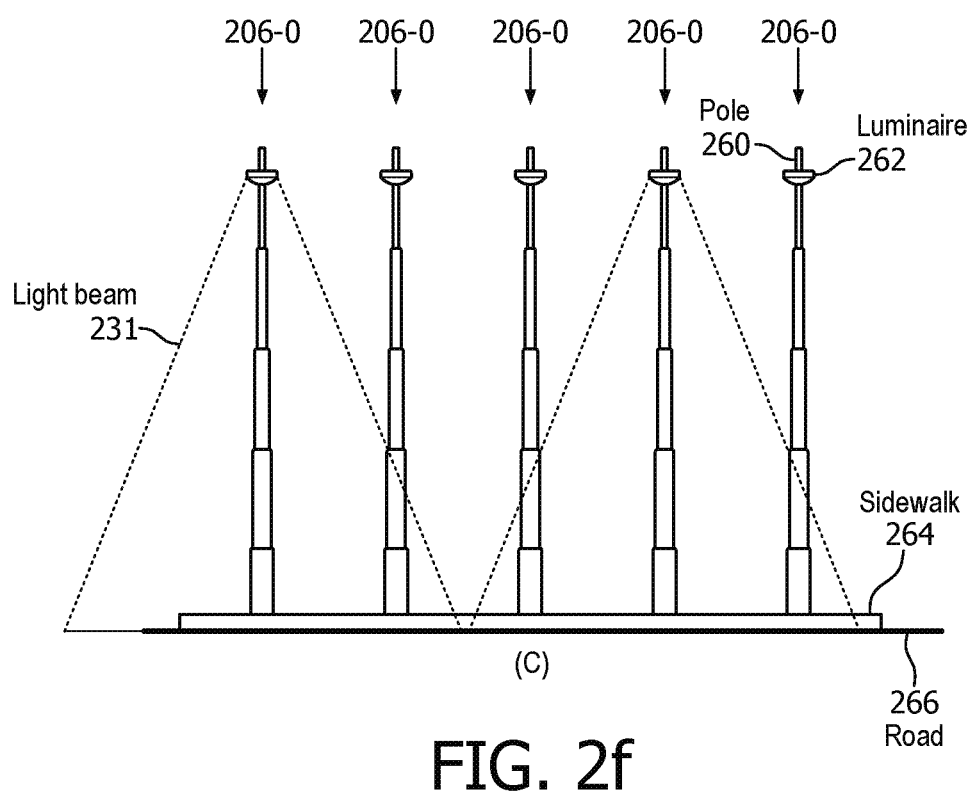

Another significant aspect of the system is shown in FIG. 2d. In FIG. 2d, the normal operation is shown when the traffic flow is high during such as the rush hour traffic in a city. In this case, the street lights are optimally controlled to achieve uniform illumination pattern 231 throughout the road. In FIG. 2e, when the traffic flow is reduced and less light is required on the road. The CMS 102 or control unit 105 may be based on DALI or other types of control algorithms. The dimming command will be processed slowly (for 1st, 3rd and 5th poles) to avoid glare or other eye adaptation impacts. At the same time, each sub-panel in the luminaire 262 (of 1st, 3rd and 5th poles) will be adjusted to a specific angle, resulting in uniform illumination pattern 231. Different from traditional dimming techniques, the 2nd and 4th poles in the figure will be completely shutdown to save up to 50% extra energy. Furthermore, if further less light is desired, the system will control both the height/orientation of the luminaire (increase the length in this case) and the angle of the sub-panels, until uniform illumination pattern 231 is achieved. In FIG. 2f, only the 1st and 4th poles will be on and rest poles will be completely shut down. Therefore, about 67% extra energy can be saved.

Figure 2G:
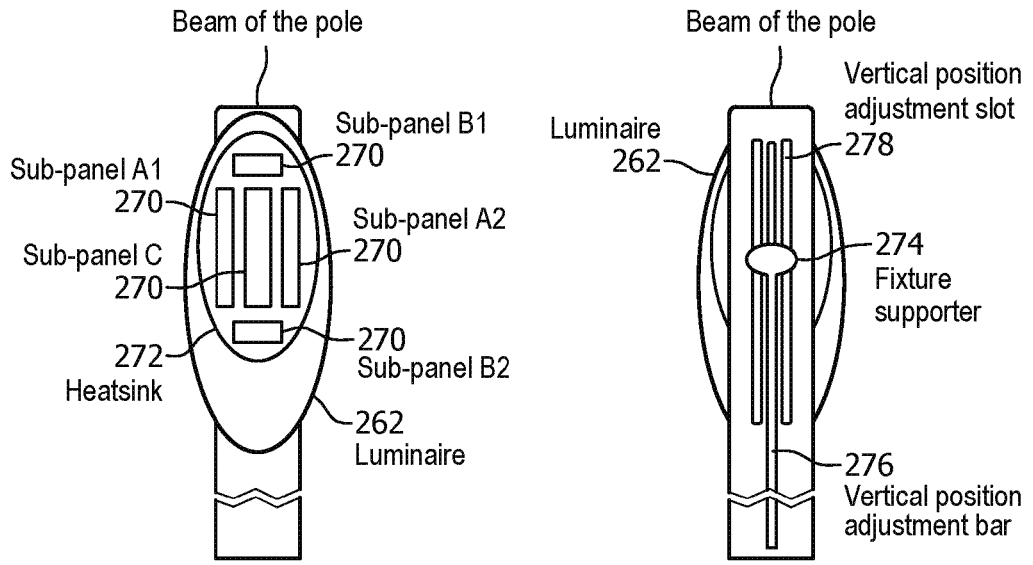
FIG. 2g is a schematic view of a lighting unit in the lighting system of FIG. 2.
Figure 2G:
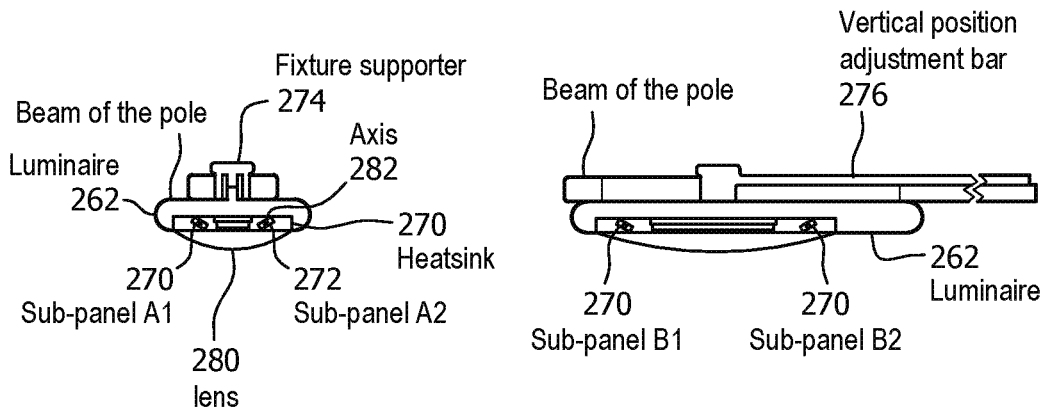

An example design of the lighting unit 206 is outlined below. As shown in FIG. 2g, the design is shown in 4 different views. The Bottom view shows the sub-panel(s) 270 position in the lighting unit 206. Sub-panel C is the central panel, which is fixed in angle and provides the main portion of the illumination pattern 231. Sub-panel A1 and A2 are the side panels to control the landscape light pattern. Similarly, sub-panel B1 and B2 are for portrait pattern, especially for light distribution to the sidewalk or intersection. Each sub-panel is with heat sink 272 and the fixture offers the overall heat sinking capability. From the top view, the lighting unit 206 supporter 274 is shown in FIG. 2g, which is connected to the adjustment bar 276 and adjustment slot 278. The adjustment bar 276 is controlled by CMS 102 or control unit 105 and the mechanical system in the pole (not shown in details) to move the luminaire 262, for example, along with the beam of the pole 260. Front view and side view shows lens 280 and the axes 282 of the sub-panels 270 and the controlled angles to achieve desired illumination pattern. When the angle of the sub-panel A1 and A2 is changed, the landscape scale of the illumination pattern will be changed. For example, the light illumination pattern transition is shown from FIGS. 2d to 2e or vice versa. The sub-panel B1 and B2 in the side view is shown to adjust the pattern along with the beam of the pole. For example, the transition is shown from FIGS. 2e to 2f or vice versa.

Figure 2H:
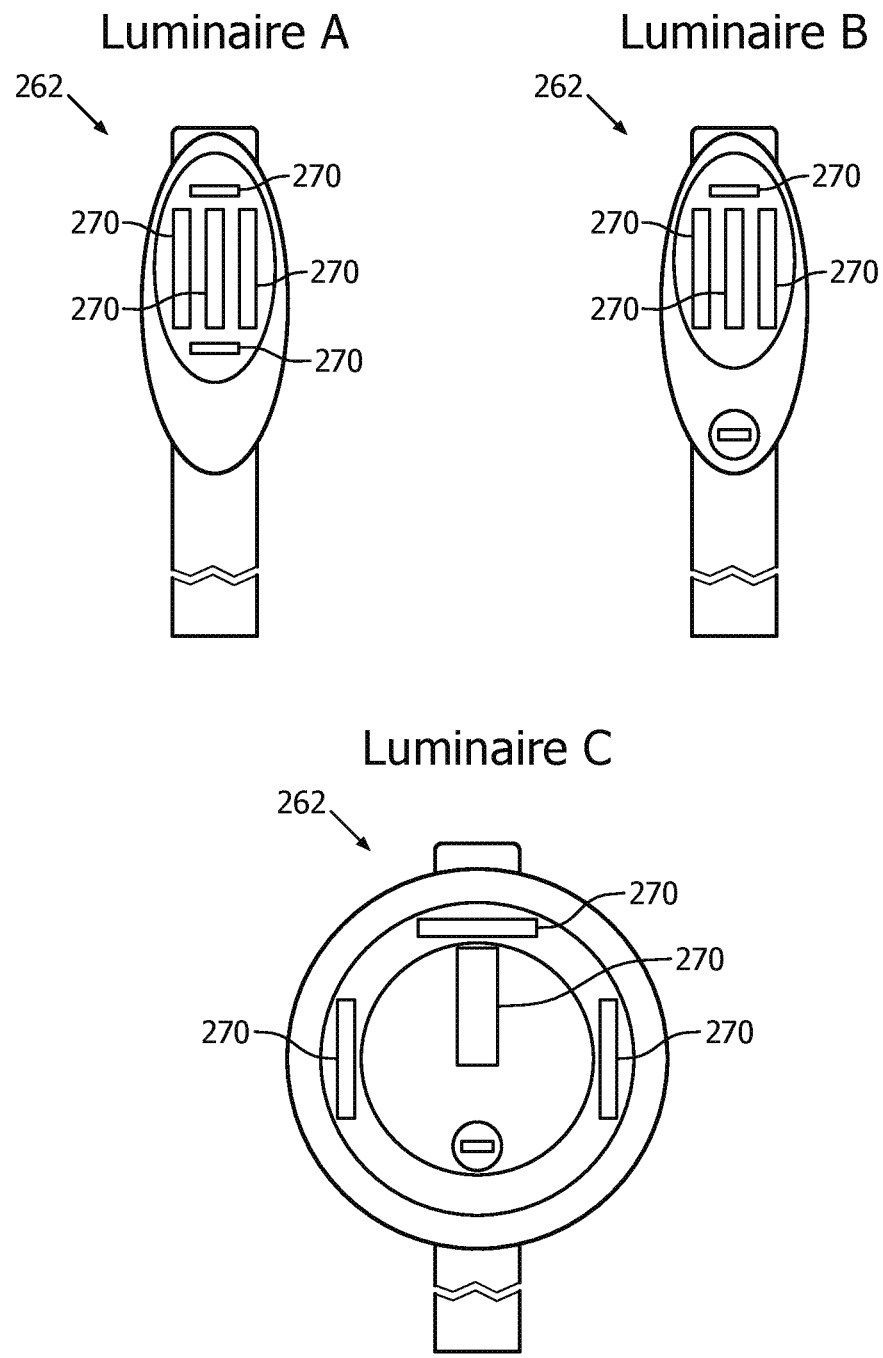
FIG. 2h is a schematic view of exemplary lighting unit designs in the lighting system of FIG. 2.

Three luminaire designs for lighting unit 206 are shown in FIG. 2h. Luminaire A is the same as FIG. 2g. Luminaire B is for the application shown in FIG. 2c, in which specific LED string is enclosed for sidewalk lighting. Luminaire C is suitable for the parking lot lighting. The basic idea is similar that sub-panel is flexible to change the illumination pattern 231.

The control unit 105 and power unit 114 for the exemplary lighting unit 206 (e.g. luminaire designs) in FIGS. 2g and 2f are described below. An LED driver is normally an isolated AC/DC plus a DC/DC converter with both constant voltage and constant current control modes. The control unit 105 (usually an analog integrated circuit chip) is sitting on the primary side and controls the LED current/voltage with respect to the feedback/compensation information from the secondary side. The sub-panel strings could be controlled individually to have different currents, thus, different brightness. The CMS 102 or control unit 105 can control both the electrical and mechanical system of the lighting unit 206. The current information of each of the strings will be sensed by analog-to-digital converter of the CMS 102 or control unit 105 to control the string current respectively. A 3.3V power supply is from the main LED driver secondary side.

The commands received from, for example, input/output devices 239 will be processed by CMS 102 or control unit 105 and a control signal sent to the electrical system and mechanical subsystem. Importantly CMS 102 or control unit 105 delivers specific commands to the mechanical system in the pole and the luminaire to adjust a) the height of the fixture; b) the angle of each of the sub-panel; (c) the position of the fixture along with the beam of the pole and d) others (e.g. orientation of the fixture). The mechanical system may have an additional control unit to execute the commands from the CMS 102 or control unit 105.

One embodiment, for example, relates to reducing the so-called the black hole effect in front of the tunnel entrance, or threshold zone. The significant daylight and tunnel light contrast will lead motorists to slow down as they approached the tunnel entrance. While the driver's eyes to adapt to the brightness level of the day, nearly non-or dimly lit tunnel entrance, drivers tend to brake. It causes traffic back-up and the associated risk of accidents.

Figure 2I:
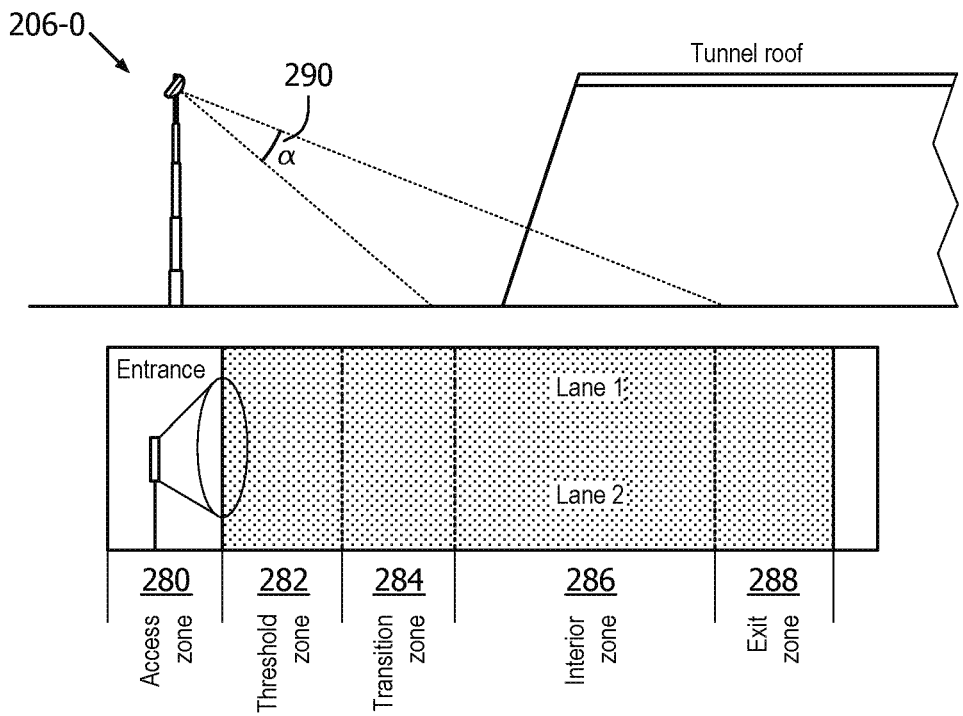
FIG. 2i is a perspective view of an illumination pattern of the lighting unit in the lighting system of FIG. 2.

The typical longitudinal section of a one way tunnel is defined in CIE 88 2004: Guide for the Lighting of Road Tunnels and Underpasses (CIE: The International Commission on Illumination). As shown in FIG. 2i, It defines an access zone 280 which approach distance to a tunnel entrance where the decision to continue at the present speed, slow down or even stop. For the entrance of tunnel, CIE defines threshold zone 282 as the first part of the tunnel, directly after the portal. The threshold zone starts either at the beginning of the tunnel or at the beginning of the daylight sunscreens when occurring. For the interior of the tunnel, it defines a transition 284 and interior 286 zones and finally an exit zone 288.

The CIE 88 2004 standard and most countries' tunnel lighting standards, define the tunnel lighting starts from threshold of the tunnel. It recommends high power luminaries in this zone: Lth=K*L20. L20 in the access zone is defined as the average of the luminance values measured in a conical field of view, subtending an angle of 20° (2×10°), by an observer located at the reference point and looking towards a centered point at a height equal to one quarter of the height of the tunnel opening. K depends on the defined vehicle speed In this embodiment, light unit 206-0 unit (which can also be installed in a dust and water proof housing) includes two sensors 226, one traffic flow sensor and another ambient light level sensor or hybrid two sensors (alternatively a luminance camera can be used in the tunnel access zone or, it also could work together with the photo detector of the tunnel threshold zone to get a more accurate result). Light unit 206-0 could be installed in the tunnel access zone or tunnel gantry. Alternatively, the light unit 206-0 can receive traffic flow and weather (ambient light) data from resource server 112, if others sensors are not installed or are unavailable. The control unit 105-0 or CMS 102 processes data from the two sensor 226 (e.g. traffic flow monitoring sensor and real time ambient light level information), to control the tilt angle 290 of light unit 206-0 (e.g. tilt angle/height adjustment). The tilt angle 290 adjustment module can use, for example, a servo system or use multiple angle LEDs to get the different tilt angle of beam, (the height of the light unit 206-0 may also be adjusted, as described above). The lighting module may comprise a dimmable LED panel, heat sink and driver (not shown) and the brightness is adjustable, as described herein.

Figure 2J:
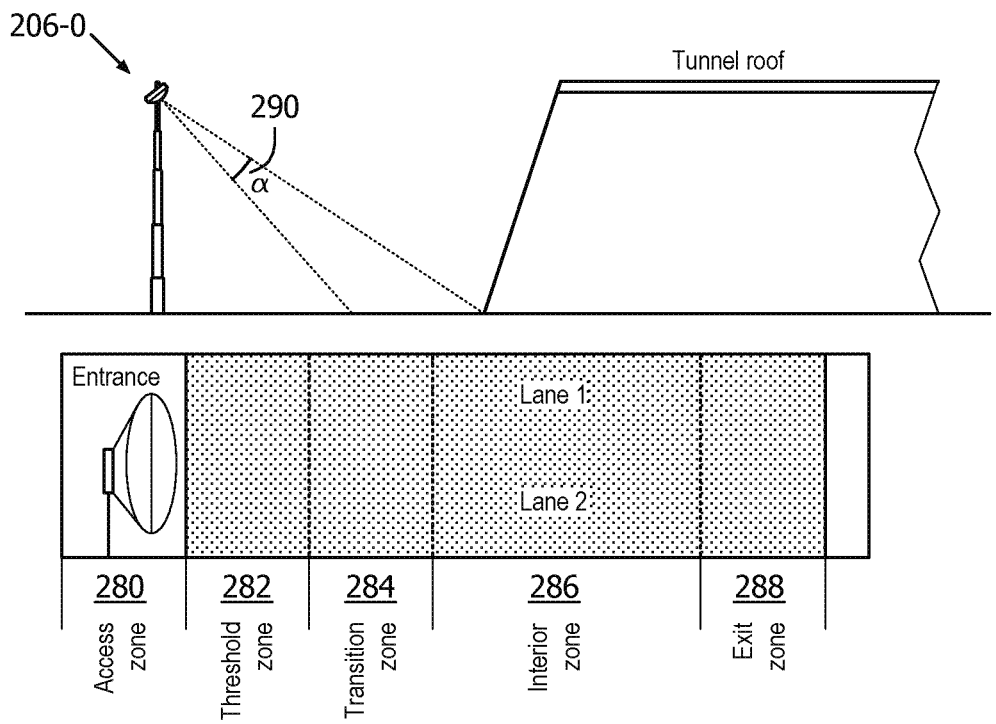
FIG. 2j is perspective view of an illumination pattern of the lighting unit in the lighting system of FIG. 2.
Figure 2K:
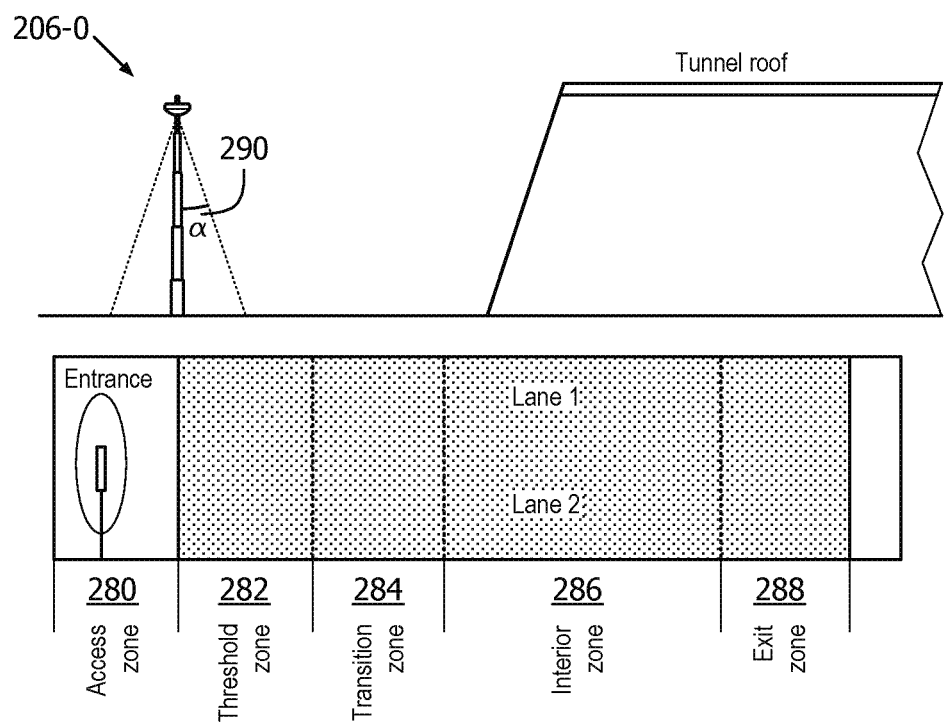
FIG. 2k is perspective view of an illumination pattern of the lighting unit in the lighting system of FIG. 2.

Light unit 206-0 detects the ambient light level and traffic flow. The recommend height is aligning with the tunnel proof, e.g. not higher than the height of the tunnel opening. The (two) sensors 226s gather the information of ambient light level and traffic flow then transfer data to control unit 105 or CMS 102. The control unit 105 or CMS 102 uses the sensing data to automatically control the tilt angle 290 (as shown in FIG. 2i-2k) and adjusts the brightness of light unit 206-0 and continuously monitors the sensor data. It automatically adjust the tilt angle 290 of the light source and adjust the brightness of the lamp, to reduce the "black hole" effect then improve the traffic safety of the tunnel.

The method of title angle and brightness adjustment is shown, for example, in Table 1, which shows 12 modes defined in this invention. It combines the information of both traffic flow and ambient light level.

TABLE 1

| modes defined in the invention | | |
|---|---|---|
| Traffic flow level (Heavy) | Traffic flow level (Medium) | Traffic flow level (Minor) |
| Mode 1: Sunny + Traffic flow level (Heavy) | Mode 2: Sunny + Traffic flow level (Medium) | Mode 3: Sunny + Traffic flow level (Minor) |
| Mode 4: Cloudy + Traffic flow level (Heavy) | Mode 5: Cloudy + Traffic flow level (Medium) | Mode 6: Cloudy + Traffic flow level (Minor) |
| Mode 7: Overcast or rain or snow + Traffic flow level (Heavy) | Mode 8: Overcast or rain or snow + Traffic flow level (Medium) | Mode 9: Overcast or rain or snow + Traffic flow level (Minor) |
| Mode 10: Night + Traffic flow level (Heavy) | Mode 11: Night + Traffic flow level (Medium) | Mode 12: Night + Traffic flow level (Minor) |

The Traffic flow level, as defined in CIE 88 2004, relates to the tunnel specification. A typical definition for a single direction tunnel is: "heavy" means the Traffic flow level is larger or equal to 2400 v/hr, "medium" means the volume is between from 700 v/hr to 2400 v/hr and "minor" means less than 700 v/hr.

The ambient light level is different and can vary by both time and weather. Illustratively, it is classified as: (1) Sunny: 30000 lx or higher, if link with L20 luminance camera, it's higher than 2000 cd/m2; (2) Cloudy: 3000-30000 lx, if link with L20 luminance camera, it's 1000-2000 cd/m2; (3) Overcast or rain or snow: 100-3000lx if link with L20 luminance camera, it's 500-1000 cd/m2; (4) Night: below 100 lx, if link with L20 luminance camera, it's lower than 500 cd/m2

Modes 1-6, are shown in FIG. 2a; modes 7-9, are shown in FIG. 2b; modes 10-12, are shown in FIG. 2c.

As further shown in FIG. 2, the lighting system 200 may include illustratively: a motion sensor 228, a radar sensor 230, an image sensor 232, a light sensor 242, an acoustic sensor 240-1, 2, etc. (collectively "sensors 226"), which may be included in sensor information provided to a controller in accordance with embodiments of the present system. As shown in FIG. 2 the acoustic sensor 240-1, 2 may be installed close to the ground (i.e., at the bottom of the light unit/pole) so that they are close to the sound/vibration sources or may also be built inside the luminaires.

An IR temperature sensor may report temperature such as ground temperature in one or more locations about a corresponding light unit 206-N. The infrared (IR)/air (ambient) sensor may provide air temperature information in the vicinity of a corresponding light unit 206-N. Further, the image sensor may provide image information (e.g., which may be processed to determine atmospheric conditions such as whether it is raining, desired illumination levels, etc.). Lastly, the acoustic sensor may provide acoustic information (e.g., which may be processed to determine various events such as car accidents or pot holes in the road surface).

Moreover, the sensors 226 of lighting system 200 may include sensors which are sensitive to vegetation, grass reflection, especially green light sensors or light sensors with green filter and a light emitter to kill leaves around the lamp, e.g. ultraviolet light.

The motion sensors 228-N can be used to anticipate lighting needs or event detection. For example, the OLN may comprise anticipate the direction traveled by a vehicle 236-1 or user 237-1, which may include user interface apparatus 122 or input/output devices 239. Motion sensors 228-N along a road can detect the direction that vehicle 236-1 is traveling and change the light level, color temperature, direction of the next few neighboring light units 206-N in the direction of the traveling vehicle (while leaving other light units 206-N unchanged). At intersections, light units 206-N in any viable direction for travel are affected when the vehicle has begun travel along a particular route from that intersection, at which time the light units 206-N ahead of that vehicle light up while the other routes dim or are turned off. Similarly, in a parking lot or a park, motion sensors 228-N can detect the direction that a person is traveling and light units 206-N in the direction that the person is moving, or create some other illumination pattern that promotes safety, alertness, path lighting directions or other desirable goals.

Referring to FIG. 2, when vehicle 236-1 is in area 231-1 traveling along the street, the motion sensors 228-1 and 228-2 allow the OLN to determine the direction and speed of travel. In this manor the appropriate light units 206-N immediately illuminated and light units 206-N further along are illuminated ahead of the vehicle, lighting its way ahead of its path of travel. As the vehicle approaches an intersection other light units 206-N are illuminated or changed as needed, anticipating the direction of travel along one of the two streets. Once vehicle 236-1 has traveled beyond the lighted path of travel, the light units 206-N are dimmed down to the low light level or turned off until the next event sensed by the motion sensor. In this scenario, light units 206-N may be considered individual nodes in a wireless mess network.

Alternatively, a (sports) person/user could use the light units 206-N to help them maintain a pace or time. The user provides a predetermined pace or time to the light unit 206-N via the user input/output device (239-N). As the user runs (or cycles etc.) the light units 206-N indicate (e.g. flash, change color etc.) the pace or a virtual ghost runner for them to race against, using the user input/output device (239-N). For example, the user input/output devices (239-N) can display an image of a runner, cyclist, etc.

A (sports) person/user could also use the light units 206-N for repletion sets such as timed sprints between two light units 206-N where the light units 206-N illuminate alternately to indicate when to run. An accelerometer sensor or NFC sensor in the light units 206-N could sense when the runner has reached a light unit 206-N to assist with timing.

In addition, the sensors may detect other hazards in the vicinity of the lighting system. For example detecting pothole 238-1 and alerting vehicle 237-1. Still further branch 241-1 of tree 241 may be detected (for example via color detection, shape recognition, texture recognition, edge gradient histogram, ultrasonic sensor to detect the branch/leaf distance from the light unit, etc.) obstructing light unit 206-N from functioning appropriately. Alternatively, the light sensor may be located below of the light unit facing up, which can continuously detect the light from the light unit at night. A comparison with historical luminance data can determine whether there is vegetation overgrowth problem that can be reported to CMS 102. CMS 102 may be alerted of pothole 238-1 or branch 241-1 and maintenance scheduled. Alternatively, the light unit 206-N may be equipped with a light emitter (such as an ultraviolet light) designed to inhibit or kill the branch 241-1 or other vegetation in the vicinity of the light unit.

The acoustic (sound or vibration) sensors 240-N may take samples with a regular frequency. Depending on the sampling rate, this may require high bandwidth in the communication. Each sensors 240-N may extract the background noise from the data, and transmit the sensory data only when the sound level exceeds a threshold. Therefore, background noise data will not be transmitted.

To save communication bandwidth, each sensors 240-N may decrease its sampling frequency if the sound level within a time window is less than a threshold. However, in this case, the sensors 240-N may miss some events that are supposed to be detected. To improve this, sensors 240-N can communicate with each other to inform the coming traffic. For example, when a sensor 240, at one light point detects sound greater than a level, it sends a notification to the sensors 240-N next to it (one on each side). If the traffic direction can be determined, it may only send the notification to the next sensor along the traffic direction. When receiving a coming traffic notification, sensors 240-N will increase its sampling frequency for a period of time. This period can be determined by the average traffic speed and the distance between sensors 240-N. If the sensors 240-N detect something interesting within the time period, it will propagate this traffic notification to the next sensors 240-N down the road. Since the notification packets travel much faster than traffic, the sensors 240-N always receive the notification and start sampling before the traffic approaches.

The sound signals within a time window can first be processed through a high-pass filter to remove unnecessary engine noises and wind noise, and are then converted into the power spectrum by fast Fourier transform (FFT). After that, we extract various features from this power spectrum. The most popular features used in acoustic analysis include total power, subband power, spectrum centroid, signal bandwidth and Mel-frequency Cepstral Coefficients (MFCC). These features are obtained at each sensor for the current time window. These features of each sensor 240-N also evolve over time. Therefore, in the final sound profile, we use the averages of the feature values over time.

A sound profile of each sensor 240-N represents a point in a high dimensional feature space. The noise profiles for sensors at adjacent light points should be very similar. This means that these profiles form a cluster in the feature space. Existing algorithms can be used to find outliers in the cluster. If an outlier is found, we know that something happens at that location. This could be a road surface problem or a car accident. However, if this outlier exists for a long time, then we know that something particular to this location happens, which must be related to road surface.

The above method works without learning from labeled data. As time goes on, the road maintenance team is dispatched to repair the road, which can confirm/label the road surface condition and the severity for different sound profiles. With these sound profiles labeled as training data, existing machine learning algorithms can be used to find correlations between the sound profiles and different road conditions/severities. During system operation, given a sound profile outlier, the system can map it to a road surface condition/severity.

When an abnormal surface condition is detected, the CMS 102 will be notified and maintenance can be scheduled. Static priorities can be assigned to different road surface conditions and severity. The maintenance teams can be dispatched based on the priority of the repair. Also, the locations of the repairs can be taken into account so that repairs within vicinity can be scheduled for repair together. Furthermore, higher priorities may be given to roads with higher traffic. This prioritization can also be done dynamically by the surface condition estimate algorithm. When there is a problem on the road surface, the estimate algorithm detects it faster and with more repetitions if the traffic volume on this road is high.

Still further, light sensor 242 can also be used for hazard detection. Each light sensor 242 obtains the intensity of the reflection light from the local road surface (for example for 2~3 hours after midnight every day). Thereafter CMS 102 or control unit 105 determines the average or median intensity. Average or median intensity ($I_i$ at time i) helps avoid the influence of temporary vehicles and pedestrians. The original recorded light intensity ($I_o$), is previously recorded, for example at system installation. Since there are no defects on the road surface at that time, it establishes a reference to be compared with current data.

Defects on the road surface such as inclement weather (e.g. rain, snow and ice) will influence the reflection light, thus, $I_i$ cannot be directly compared with $I_o$. However, since inclement weather generally occurs in a large area and most light sensors will detect a difference when comparing current data with their original data. When sensor 242 determines this condition after communication with other sensors 242, it directly ignores current data $I_i$. This cooperation can be done at each light unit/pole 206-N when each light unit 206-N is mounted with an embedded lighting system.

Local temporary road conditions such as objects, leaves, garbage will also influence the reflection light, thus, $I_i$ cannot directly be compared with $I_o$. Thus the need of variable $I_i'$, which is defined as the following equation.

$$I_i' = I_{i-1}' + f \cdot I_i, \text{ where } I_0' = I_o$$

where f is the learning factor. The smaller f is, the smaller the temporary road condition influence $I_i'$. The recommended value is 0.1. With this equation, only local reflection light difference exists for several days (bad weather day is not included due to step 2), $I_i'$ will finally update to $I_i$.

4) Each sensor 242 compares $I_i'$ with its original data $I_o$ every day. Set a threshold th, if $|I_i' - I_o| > th$, the respectively light unit 206-N can report to CMS 102 which indicates that there exists road surface defect.

Also the light can give a stepwise or square wave light on the road and detect the reflection light. Because stepwise or square wave contains many different frequencies, different road surfaces will give different response curves which represent the total response to all these frequencies (frequency response). If this curve changes significantly, it can also indicate that there is a defect.

Besides notifying the maintenance teams, the same methods can be used to notify drivers. In addition, the notification can also be sent to the navigation device, which can determine the best route based on this information.

The, light units 206-N may be part of a single mesh network and the network may communicate with a CMS via the master light unit 206. The selection of which light units 206-N are adapted to be the slaves and which is adapted to be the master may be done according to various criteria, including optimal location for the master light unit 206 cell or satellite communication with the internet, and/or proximity to support and maintenance structure, for example. It may be noted that "on-light unit" refers to actions that are specific to one light unit 206 that do not relate to other light units 206-N. For example, motion sensed at a single light unit 206 in a parking lot will increase the light level for just that light unit 206, and does not involve other light units 206. It may be noted that "across-light units" means that a series or group of light units 206-N are involved, for example, a series of light units 206-N along a street. As a car passes at least two light units 206-N, the motion information (speed, direction of travel) must be communicated to the other light units 206-N along the street in order to 'light the way' ahead of the cars travel path.

Controller 205 and/or a CMS may also process the sensor information and/or other information (e.g., received from a third party or resources server 112) and determine a lighting setting, lighting sequence, object motion, event situations or pattern in accordance with the information and/or the sensor information. For example to signal a dangerous road condition or a directional path lighting method. The controller 205 and/or a CMS may then form corresponding lighting setting information that may be transmitted to one or more of the light units 206-N. The lighting setting information may include information that may be used to control characteristics of a light unit 206-N such as power use, illumination patterns, illumination intensities, illumination spectrums (e.g., hues, colors, etc.), illumination polarizations, etc., of one or more of the light units 206-N. Further, in accordance with embodiments of the present system, it is envisioned that one or more light units 206-N may transmit sensor information to a neighboring light unit 206-N (e.g., using a low power communication link) which may then form corresponding sensor information for two or more light units 206-N and transmit (e.g., using a higher power communication link) this sensor information to the controller 205 and/or CMS for further processing.

Moreover, with respect to an illumination pattern 231-8, the CMS may control the light units 206-N to adjust illumination intensity for one or more determined areas or portions of one or more areas of an illumination pattern (e.g., see, darker shading which indicates brighter illumination than lighter shading in FIG. 2) in accordance with the lighting setting information. Thus, for example, assuming a light unit 206-N such as the light unit 206-8 may illuminate an area 235-8 which may correspond with, for example, an illuminated matrix $(x_i, y_j)$, the CMS may control the illumination source 206-8 to adjust an illumination pattern to illuminate an area such as the whole matrix $(x_i, y_j)$ or a portion of the matrix such as an area defined by an illumination pattern 231-8. Moreover, within an illumination pattern such as the illumination pattern 231-8 the controller may control the light unit 206-N to control an illumination intensity (e.g., in lumens/area$^2$) such that portions of the pattern 231-8 have more or less illumination as illustrated by the above mentioned lighter and/or darker shading shown within the illumination pattern 231-8. Thus, an illumination pattern, color temperature and/or an illumination intensity (e.g., within the pattern or within the whole area illuminated by a corresponding light unit 206-N) may be controlled by the system.

In one aspect of the invention light unit 206-N detect wireless signals sent from vehicles 236 or users 237 (hereinafter "users"). The wireless signals, for example, via DSRC or WiFi radios, or any other wireless radios, includes identities of the users. The identities can be represented by VIN numbers of vehicles, and/or MAC addresses of wireless radios. Light unit 206-N records the wireless signals together with the identities, timestamp, and signal strength. Other information about the wireless signals may be also included depending on the receiver radio's capability at light units, such as angel of arrival. Light unit 206-N sends collected information of wireless signals to CMS 102, which stores and updates the information in a vehicle/user database. The vehicle/user database is organized in a way that users are grouped together around the closest light unit 206-N on the same road and relative locations from vehicles/users to the light unit 206-N are recorded. Traffic speed and volume information around each light unit 206-N is derived by CMS 102 according to multiple wireless signals from vehicles/users. The traffic speed and volume information can also be obtained by sensors 226 installed on light units 206-N. All traffic speed and volume information obtained from various ways can be integrated together to provide more accurate and complete services. The other types of sensors 226 can also be used to help to obtain accurate traffic information, such as magnetic sensors, acoustic sensors, and CO2 sensors.

Besides providing the traffic speed and volume information, the user database also serves another important feature to locate each user according to its identification information, e.g. MAC addresses of wireless radio in the vehicle or the VIN of the vehicle, and provide customized services. This can also be used to determine possible traffic violations and the output could be not only a specific location, but a list of locations that determine the history of the given user within certain time interval. Other methods of identifying each vehicle can also be used by the proposed system and provide information to the vehicle database. For example, cameras can also be used to detect plate number of vehicles, which also uniquely identifies each vehicle.

A smart device in a vehicle/user sends a request to query traffic information ahead of the vehicle to CMS 102. The request includes the identity of the user, such as the VIN of the vehicle, or the MAC address of the wireless radio in the smart device or in the vehicle, or plate number of the vehicle. CMS 102 receives the request and obtains the user's identification number. The identification number is used by CMS 102 to query the user database to obtain the light unit 206-N closest to the user and the relative location between the light unit 206-N and the user. The CMS 102 uses the location information relative to light units 206-N to serve service requests from users.

The user interface apparatus 122 or input/output devices 239 in a vehicle or with a user sends a request to query traffic information ahead of the user. After receiving such a request, CMS 102 first matches the request (using the identification information in the request) to the location of the user, then provides traffic information around the location and sends the information back to the user, where the local traffic information includes traffic speed/volume, road accidents, and road constructions.

CMS 102 or other system manager (not shown) may send traffic information to subscribed users. If there are some events (e.g., traffic accidents, new construction, etc.) happening ahead of vehicles/user, these events are sent to the users in real time.

The user interface apparatus 122 or input/output devices 239 in a vehicle or with a user sends a request to query better travel routes/directions and smart local detour information if inclement weather (e.g. fog, snow, etc.), road congestion and/or road construction conditions are ahead of the user. Such a request includes the next destinations that the user is going to. After receiving such a request, CMS 102 first matches the request (by using the identification information in the request message) to the location of the user, checks the various information database, then provides hazard indictor, or better route and smart local detour information based on the local information around the vehicle, and sends the information back to the user or via an indication using input/output devices 239 on a light unit 206-N. Some standard shortest routing algorithm can be used, such as Bellman Ford and Dijkstra's algorithms, by using delay, route length, or other metrics as the cost in these algorithms.

CMS 102 may also query traffic information between the input/output devices 239 and several popular locations ahead of the moving direction of users. CMS 102 sends messages including the traffic information to the input/output devices 239, which shows the messages. These messages can include road condition, road construction, traffic congestion, and/or delay to certain destinations.

CMS 102 dynamically changes the display messages on the input/output devices 239 to perform tasks such as adaptive traffic balancing. For adaptive traffic balancing, detour messages on displays are controlled and adaptive to real-time traffic information. When the traffic speed on the road is slow and traffic volume is high, CMS 102 may find alternative routes which are better in terms of distance and time to certain destinations. These alternative routes are shown on the input/output devices 239. CMS 102 monitors the traffic information, e.g. through the user database. If there are better alternative routes or better alternative routes change, CMS 102 sends messages to the input/output devices 239 to change the displayed detour messages accordingly.

CMS 102 analyzes all requests from users moving close to input/output devices 239. One such request is normally generated by a driver once when he or she sends a route request to the CMS 102, which constantly serves the request and may actively send instructions to a driver whenever it receives a new location of the vehicle. Destination addresses are extracted from these requests. Some destinations are chosen by CMS 102 according to certain rules, which may choose several most popular destinations, or choose several common locations between the outdoor display and most destinations. CMS 102 query the service database and obtain traffic information between the input/output devices 239 and the chosen destinations and sends a message including the information to the input/output devices 239, which shows the messages. The messages are adaptive to passing vehicles.

CMS 102 analyzes all requests from users moving close to the input/output devices 239. Destination addresses are extracted from these requests. Some destinations are chosen by CMS 102 according to certain rules, which may choose several most popular destinations, or choose several common locations between the outdoor display and most destinations. CMS 102 chooses advertisements based on the chosen destinations. These advertisements can be chosen according to the business of the destination addresses, such as gas stations, shopping malls, restaurants, etc., or according to businesses around the destination addresses. CMS 102 sends these advertisements to outdoor displays, which show these advertisements accordingly.

Some sensors 226 are installed on light units 206-N to detect occupancy status of parking lots nearby. These sensors 226-10 could be camera sensors with some basic image processing, or infrared sensors. One sensor can monitor one or more parking lots around a light unit 206-10. One example of the image processing algorithm is to compare the image without vehicle within the parking lot and the image with one, and test whether there is a significant difference for the parking lot part of the two images. Vehicle detection algorithms can be also used together with camera sensors. Some sensors 226 can also be installed in or around a parking lot, and they can communicate with the light units 206-10 about the occupancy status of the parking lots.

The street parking lots as well as large parking areas are monitored by light units 206-N through these sensors 226. The light units 206-N transmit messages including availability information of parking lots nearby to other light units 206-N around and to CMS 102. Each light unit 206-N can maintain a local database about the updated information about parking lots in a certain distance. CMS 102 maintains a database of all monitored parking lots. CMS 102 adaptively controls input/output devices 239, which show parking availability information, according to updates of the database. Light units 206-N can also use their local database to control parking availability messages shown on outdoor displays according to their own local database. These parking availability messages include closest available parking areas/lots and also may include how to get there (such as go ahead, turn left or right, or a map with marks on current location and the location of available parking lots).

A driver/user in a vehicle requests parking availability information through input/output devices 239 in the vehicle or a mobile device (e.g. a smart phone). The requests include the identity of the vehicle, such as VIN of the vehicle or the MAC address of a wireless radio in the vehicle. The requests can be sent to nearby light units 206-N or directly to CMS 102 through communication network 108. When CMS 102 receives such a request, it first uses the identity information of the vehicle to query the user database to find the closest light unit 206-N to the user and the relative location information between the light unit 206-N and the user. CMS 102 uses the location information to query the parking availability database, and send a message back to the input/output devices 239 in the vehicle including the parking availability information around the vehicle. The message can also include route information for the user to follow to arrive at those parking lots. If light units 206-N receive such a request from a user and they have local database about available parking lot information nearby, they can send the same messages directly back to the input/output devices 239 in the vehicle. The input/output devices 239 show the response on its screen or any available screen in the vehicle for the drive to choose a parking lot and/or follow a route to get to a parking lot.

CMS 102 analyzes all parking requests from user moving close to input/output devices 239. Destination addresses are extracted from these requests. Some destinations are chosen by CMS 102 according to certain rules, which may choose several most popular destinations, or choose several common locations close to the display. CMS 102 adaptively control outdoor display to show real time parking lot availability information in areas close to the destination addresses of passing vehicles. In this way, drivers can follow the instructions on displays and take actions in a timely manner to choose the best parking lot.

Further, the controller 205 may receive/transmit (e.g., in response to requests or periodically) sensor information which may be analyzed (e.g., using image analysis of image information received in the sensor information) either in the light unit 206-N or a CMS, and determine whether a lighting pattern is sufficient and/or to adjust a lighting pattern if it is determined that a current lighting pattern does not meet current lighting requirements (e.g., is insufficient) or to respond to a particular event (e.g. send traffic data to users, report light unit failures, road maintenance issues, etc.).

The controller 205 and/or a CMS may then form and/or update a lighting setting/reaction information database in a memory of the system 200 in accordance with information generated and/or received by the system such as the current lighting setting information, sensor information, reactions, other information, and/or forecasts, time of day, etc. for later use. Thus, lighting settings for certain patterns or responses to request or event situations may be modified by the system and/or by a user as described herein.

For example, adaptation of colour temperature for light units 206-N may be changed based on (1) weather (more blue for alerting when for example, roads are slippery, treacherous due to fog, etc.), (2) time of day/night (e.g. to deal with eye sensitivity or fatigue in predawn conditions), (3) traffic (either high speeds or high volume require greater alertness), etc. Thereby minimizing energy consumption Note that the importance or utility of each objective is both location and time varying. For instance, (a) slippery road and traffic conditions are location dependent and (b) safety risk due to fatigue is time dependent, that is most pronounced in the early morning hours. The adaptations are dynamic, meaning the lighting strategy that is adopted varies based on location of event and time of day/night. Alternatively, vehicles 236-1 or users 237-1 with driver accessories (user interface apparatus 122-1) that have flexible colour and light intensity LEDs can be used.

It is noted that the sleep physiological response to light is frequency dependent. It is known that there is a sensitivity of light spectrum to melatonin suppression. For example, blue light is more effective in melatonin suppression than red. While monochromatic (e.g. blue) light is efficacious for fatigue and efficient for energy savings, it is bad for visibility of obstacles and thus safety.

Illustratively, based on data from sensors 226, augmented by information from Resources 112 (e.g. the Internet), information related to weather (and likewise) traffic is gathered. For instance, in those parts of the city where the temperature is near freezing point and there is precipitation, greater alertness is warranted and therefore light units 206-N are adapted to increase alertness (by changing the color temperature to include more blue wavelength light). Similarly, where measurements show traffic conditions (e.g. localized greater traffic volume) requiring greater alertness, the color temperature is similarly adapted. Similarly, a time dependent profile of safety risk due to fatigue may be used, based on known studies, for example, NTSB (1995) Factors that affect fatigue in heavy truck accidents. National Transportation Safety Board, Safety study NTSB/SS 95/01, Washington D.C. & Connor J, Whitlock G, Norton R, Jackson R (2001) The role of driver sleepiness in car crashes: a systematic review of epidemiological studies. Accid Anal Prev. 33 21-41.

Another known problem is a lack of balance between the comfort of optimal visibility and appropriate energy saving. For example, as described in, The Economist, Print Edition Jun. 1, 2013; Web: http://www.economist.com/news/technology-quarterly/21578519-lighting-technology-there-light-never-goes-outit-just-gradually-dims-over)

In daylight, vision is handled largely by cone-shaped cells packed around the centre of the retina. Apart from processing colour, cone cells help the eye perceive detail and rapid changes in surroundings. In the dark, by contrast, perception is handled almost exclusively by the more sensitive rod-like cells towards the retina's periphery. For people driving at night, however, artificial lighting means conditions are usually neither pitch-dark nor light enough to see using cones alone.

Moreover, as a vehicle moves through patches of lighter and darker illumination, both rods and cones are required, and the demands on them change constantly. When it is briefly lighter, the eye is more sensitive to greenish-yellow light. When darker, it responds best to light in the greenish-blue part of the spectrum. It turns out that white LED lamps do a better job of meeting these conflicting requirements than sodium lamps can manage—and they do it at lower power levels, to boot. There could therefore be some energy savings from switching to LED streetlights after all.

Thus, in prior art lighting systems white or yellowish-street lighting is a compromise to meet conflicting requirements; the compromise is not perfect and lighting comfort suffers. The ideal is to have the right color at the right light level. Varying light level means that a vehicle moves through patches of lighter and darker illumination which is considered unpleasant.

The lighting system 200 gradually dims light (to save energy) and at the same time adjust the color to improve/maintain visibility and increase comfort. For example, light units 206-N start out during the evening and rush-hour as full-white. Later in the evening, when a new lighting (dimming) strategy is followed, the light color is adjusted as well. The lighting system 200, through sensors 226, keeps track of both the light units 206-N level as well as the total ambient light (e.g. from the moon or nearby buildings). The light strategy slowly adjusts its color with the total dimming level moving towards greenish-yellow. Later during the night, when traffic is minimal, light units 206-N are further dimmed and the color transitions towards greenish-blue. In dark nights, e.g. new moon, the total light level is much lower and the change towards greenish-blue will occur earlier in the night.

It is also noted that if color adaptive light units 206-N are used in streetlights, it increases the lifetime of the light source by allowing better calibration of the lighting output in case performance is degraded. For example, blue-white LEDs tend to become more bluish over an extended usage time. The lighting system 200 also improves on limiting light pollution. At the lowest dim levels, the optimized color ensures that less light is necessary than with another color at the same level. This again reduces light level. The appropriate color may also benefit animals that are less disturbed than with white light.

Moreover, the lighting system 200 may be used to deliberately provide unpleasant lighting characteristics intended to encourage nearby vehicles 236-1 and users 237-1 to take certain actions (e.g. leave a certain area). For example, the light units 206-10 may be positioned to be brighter point sources within the field of vision to maximize the unpleasantness of user 237-1. For safety, light unit 206-10 shouldn't be at an accessible eye level to prevent eye damage. It could be placed just over eye level (e.g. 2 m) to ensure it is in the field of view, but can't easily be reached to cause eye damage. This is the opposite of most lighting design which aims to diffuse the light and reduce the presence of bright points and harsh shadows; in this case these are desirable. Alternatively a 'very bright' setting could be added. The color temperature, color, or color rendering index or other aspects of the light could be designed for desired effects. Such as be less pleasant to intoxicated people (cold color temperature), have a calming effect (green light), or confusing (deliberately bad color rendering index). These can be accomplished while still maintaining sufficient visibility and utility for law enforcement and others. Timed operation to control the light units 206-N to come on at times when people should be encouraged to leave, such as bar closing times. The timed operation could include gradual increasing and decreasing dimming to achieve different degrees of effect at different times. Light units 206-N may be integrated with crowd measurement devices providing feedback to achieve targeted crowd levels using the input/output devices 239. Remote operation using CMS 102 allowing law enforcement or others to activate the light units 206-N when desired in case of incidents. Light units 206-N may be positioned to focus mostly on the street, near eye level, to reduce the irritation to neighborhood residents. Time domain variation, such as slow oscillations or deliberate flicker within the light units 206-N may also be used.

In some cases if the lighting has highly selected spectral components, law enforcement or others working in the district could be provided with filtering glasses to reduce the unpleasantness.

The lighting system 200 may be used to enable users 237-1 to make a request for available taxies/car services, hereinafter collectively taxi. The lighting system 200 can automatically deliver users requests via the input/output devices 239 to CMS 102. CMS102 will determine the region/area in which the request should propagate and broadcast the message to available taxies, for example by conventional wireless techniques or via input/output devices 239 located within taxies.

User 237-1 interacts with the input/output devices 239 installed on each pole or with a mobile input/output device 239. Users 237-1 can send or cancel a request. Each light unit 206-N maintains a request list. When a request is given, a message with a unique ID is added to the list. As long as the request list is not empty, an indicator light (for example via input/output devices 239 on the light unit 206-N) will indicate that there are users 237-1 waiting there. Each light unit 206-N can communicate the message with its neighbors. The size of the region to deliver the message is limited by the message delivery strategy in CMS 102, which is related to local traffic condition. Each light unit 206-N uses sensor 226 to detect the local traffic conditions, as further described below. Each light unit 206-N receiving this message will broadcast it to a small local region around it, via input/output devices 239. Taxies may have a wireless receiver to receive messages from light units 206-N. However, only the available taxies will display the message in the taxi to tell the drivers. Once an available taxi receives a request message, the driver can make the decision. If he is willing to execute the task, he will send an answer message to management center by a wireless technology as noted above. There might be multiple taxies answering one request, thus, the CMS 102 will select an optimal taxi and send the confirmation message back to the taxi to let the driver go to pick up the passenger guided by GPS, as further described below.

Each request message is only delivered to a local region near the requesting user 237-1. However, the size of the region is not a fixed parameter. It's related to the local traffic condition. If the traffic is heavy, there are already many vehicles including several taxies nearby, thus it's not necessary to send the message far away, and the taxi far away will also take much time to arrive here. Thus, in this condition, the message is only delivered in a small region. Otherwise, the size of the region is a little larger.

The message delivery method is defined as following. Parameters of the request message include: request ID, passenger position and energy. Where the "request ID" is the identity of that request, which is unique in the OLN; and the "passenger position", is the pre-calculated position of lighting pole. Since each light unit 206-N is fixed, its position (e.g. longitude and latitude) is known, for example recorded at the installation stage. This parameter is used to guide taxi to find the passenger. "energy" decides the message delivery region. At each light unit 206-N, "energy" will be subtracted by a value, which is related to the local traffic condition. If the traffic is heavy, this value is larger. Otherwise, it's smaller. As long as this value is positive, each light unit 206-N will deliver the message to its neighbors. Otherwise the message delivery will stop. Thus, the traffic condition decides this parameter and the delivery region.

The Message delivery strategy includes: when the request is given by user 237-1, a message is created by the first light unit 206-1, which includes the above noted parameters. Then the first light unit 206-1 delivers this message to its neighboring light units 206-N. The neighboring light units 206-N will check the "energy" parameter. If this parameter is positive, it will broadcast this message to its local region around it by a wireless technology. Each taxi has a receiving device. If an available taxi is in that region, it will receive the message and tell the driver. Then "energy" is subtracted by a value consumption, which is related to current traffic condition. Each light units 206-N has sensor 224 to detect the local traffic status/condition, if the local traffic is heavy, consumption is larger, otherwise, it's smaller, given by the following equation:

$$\text{energy} = \text{energy} - \text{Consumption}$$

If the traffic is heavy, the message will be delivered in a small region. Otherwise, the region will be a little larger. If "energy" is negative, it will stop delivering the message.

The algorithm for selecting optimal taxi in management center is as follows. There may be multiple available taxies responding a same request. Thus, when CMS102 receives several responses to a same request, it selects an optimal taxi which might arrive at the waiting users 237-1 location earliest. Since the request message contains a parameter "energy", which represents the accumulation of traffic conditions around each light unit 206-N from the user's 237-1 location to each taxi, it will be used to evaluate the travelling time consumption from each taxi's place to the user 237-1. And since the distance between every two neighboring light units 206-N is approximately equal, "energy" is decided by the length of the path from the user 237-1 to the taxi and the accumulated traffic conditions.

If the path from the user 237-1 to a taxi is longer, there are more light units 206-N and the accumulation of consumption is larger, which results in lower "energy", and also if the accumulated traffic condition is heavier, accumulation of consumption is also larger and "energy" is smaller. Thus, the taxi with largest "energy" might arrive at the user's 237-1 place earliest, which is the optimal taxi.

Thus, the optimal taxi selection algorithm is comparing the "energy" parameter of each taxi's message and arranging the taxi with highest "energy" to pick up the user 237-1.

With a battery 220 the OLN can also respond to power outages when connected on the grid to create an uninterruptible power supply (called herein "UPS"). The OLN detects the loss of grid power and communicates with the utility company to determine how to place power from the energy storage device back onto the grid. The OLN can also act as a UPS in a small localized energy grid, eliminating or supplementing backup power generators. The behaviors would be similar to that on the larger power grid.

The preferred embodiments comprise adaptations for independent processes, such as independent monitoring, control, and output (light, alarms or other communication, etc.), which independent comprise sensing, communication and control only between the light units/nodes of an individual OLN. When adapted and operating in this independent mode, the preferred array may be considered an independent array and/or an independent network of nodes.

In addition, the preferred embodiments comprise adaptation for non-independent processes, such as communication between the master light unit/device/light unit of the OLN and the CMS. Preferably each of the preferred light units 206-N employs batteries, recharged by solar panels that may be used to transmit signals to multiple of the other slaves, and the master preferably also employs a battery(ies) to transmit signals to a remote location. Thus, an important and novel feature of the preferred embodiments is that multiple light units of a single network comprise equipment and programming on or in the light unit that adapts said multiple light units of a particular OLN to communicate with each other. This independent communication between the light units of each OLN create the "independent" feature of each OLN, in that at least one, and preferably several, sensing and control tasks are handle between the multiple light units without requiring control from the CMS. The preferred OLN each also have a self-discovery feature for self-identification of new light units and integration of the new light units onto the network. The especially-preferred light units/devices/light units of each OLN are each powered by a battery and can use solar panels to recharge the battery. Preferably, each outdoor light unit of the OLN has a wireless modem and controller forming a wireless network, for monitoring and control of its devices to allow for adjustment for low battery conditions and the ability to measure excess power generated by the devices to be placed back on the grid, for example, for being applied for a credit to the account. Optionally, the master light unit/device/light unit, as described above, may also communicate to, or receive from, the CMS information and instructions about said low battery conditions and/or excess power. Outdoor lighting arrays, particularly in public settings provide a ready-made wireless infrastructure, since nearly all municipalities and many public roadways utilize light units. In such settings, it is desirable for individual outdoor lighting nodes, within an array of outdoor lighting, to behave in an interdependent manner. It is also desirable for the lighting fixtures and/or devices connected to these outdoor light units to behave in an intelligent manner to enhance security and safety, while minimizing energy costs. In addition, because public outdoor lighting arrays form a ready-made wireless infrastructure, they are ideally suited to wireless communication for public safety, or with the proper protocols and security, for public access to the internet.

As noted above, the OLN may include slave and master light units. A slave light unit of the OLN may consists of an outdoor lighting structure with lighting fixture, network board with a micro controller, power supply, electronics as required for the mesh network, and zero, one or more devices that act as sensors or active devices. There is also a wireless modem "on-board" each slave light unit. An AC to DC power supply connects it to an AC system if available. If no power is available, a wind generator and/or a solar collector power the system. Power can be stored to an energy storage device, such as a battery, capacitors, fuel cells, or devices that store and release hydrogen.

A master outdoor light unit of the OLN has all of the same components as the slave light unit with the addition of a cell or satellite radio. The wireline, cell or satellite network is already in place, which provides the communication to the CMS.

The outline below lists some, but not all, of the features/ options that may be included in various embodiments of the OLN invention. Following are "supportability" features: It is preferred to include, in the OLN controller/programming, a method for separation of operational parameters from code, with the following preferred features: all operational parameters that affect how the systems and algorithms behave are abstracted out of the code, leaving behind variables in the code that are evaluated at system start; operational parameters are stored separately from code in a profile that is easily read and processed by the code; said profile should be easy to replace in its entirety; individual values for operational parameters in said profile should be easy to replace; on system restart or reset, all systems and algorithms flush their values for operational parameters then re-read and re-process operational parameters from the profile; a method for an operator or maintenance personnel to reset the device at ground level (i.e. standing on the street), like a reset button. Pushing this button is the equivalent to power cycling the system, which causes all hardware, firmware and software to re-initialize, re-read and re-process all operational parameters; a method for indicating device system status, like a 3-color light or set of lights (e.g., green, yellow, red) at ground level that conveys one of three states: operating properly, operating but there is an issue needing attention, and not operating. This provides ground level feedback regarding whether to push the reset button as well as whether or not pushing the reset button resolved the issue.

Methods and algorithms are used that create modularity of systems on the device in order to: facilitate unit testing as the number of components increases; more easily enable in-field, black-box replacing as a cost-effective support strategy in the field; and so that replaced modules are sent back to the manufacturer or certified service representative for troubleshooting, repair and recirculation.

Methods and algorithms are used to enable an expandable bus architecture on the device to enable in-field hardware feature expandability over time (e.g., new sensor, high bandwidth radio, video camera).

Following are "Networking & Control" features that are preferably included in various embodiments of the OLN invention: the following features are preferred "on-light unit", that is, on EACH individual light unit or on a plurality of light units in the wireless network: algorithms to perform all functions in above through a network and set of commands and protocols.

Preferably included "on-light unit" for event management: algorithms for monitoring and storing discrete and continuous triggers, interpreting triggers and translating them into events to be published; algorithms for subscribing to and receiving events with specified attributes as a way of performing a task in response to a published event; algorithms for interpreting one or a collection of conditions, assessing their severity and then determining whether a warning or error condition exists; algorithms around scheduling jobs at predefined times and/or with predefined frequencies to perform tasks; and algorithms enabling the way an event is treated throughout the system to be dictated by the classification and characteristics of the event itself.

For joining a network and self-organizing: algorithms for initialization processes that include broadcasting across frequencies and channels to find other devices within range; and algorithms surrounding whether to join an existing network versus creating a new network in response to other devices located within range, their functions within the network, their capabilities and the breadth of the networks they share.

The following features are preferred to be "Across-Light Units" (that is, between multiple light units): algorithms around how, where, and how redundantly to register a device's capabilities on a network; algorithms for determining connectivity issues on the network, routing around issues, repairing issues and reestablishing routes once repaired; algorithms for favoring efficient routing, penalizing inefficient routing and adjusting both over time based on changeable definitions of efficiency; algorithms for locating and sharing resources on the network as resource availability and location changes over time; algorithms for securing the network against unauthorized "network joins" and ensuring intra-network communications cannot easily be intercepted and interpreted; algorithms for using monitoring events across a population of devices to determine a coordinated action to take like lighting the way ahead of a walker along a pathway or turning on a video camera based on triangulation of multiple device motion sensors, such as: algorithms that detect motion (direction and velocity) and estimate the future direction and location of the moving object as a function of time; and algorithms that activate devices based on the anticipated location of the moving object per the algorithms in (i.e. turning on or brightening lights or turning on/waking up security cameras ahead of a moving car or moving person).

Algorithms for aggregating events over populations of devices, rolling up event information based on criteria, interpreting low-level event information and using it to create new higher-order events; algorithms for determining the location of a device based on known fixed locations and triangulation of multiple device radio signals; algorithms that allow light units in a network to look for and sense different sensors that come into range of the wireless sensor (s) on the light units; algorithms that allow light units in a network to identify and categorize the different types of sensors that come into range of the wireless sensor(s) on the light units; algorithms that allow light units in a network to communicate with the different types of sensors that come into range of the wireless sensor(s) on the light units; and algorithms that allow light units in a network to activate certain function on the different types of sensors that come into range of the wireless sensor(s) on the light units.

Regarding Content and Information Delivery (for example, gathering of weather or other information from networked devices by communication from one of more nodes/light units of a OLN to the CMS, and/or providing messages, advertising, and public information that may be communicated from the CMS to one of more nodes/light units of a OLN and then to the public): algorithms involving securely bridging a low-power, low-bandwidth network and a medium-power, high-bandwidth network, or providing secure gateway capabilities between the two networks; algorithms for aggregating information across populations of devices and securely delivering this information through a broadband wireless infrastructure to a OLN-manufacturer-operated network operations center; and algorithms for guaranteed or best-efforts delivery of information to the network operations center based on the classification of the information.

Regarding Management that may be preferred and/or necessary for the business of operating and maintaining a OLN: algorithms around creating and managing user/customer accounts and passwords with associated roles and permissions that span different kinds of customers as well as the needs of the OLN manufacturer itself; algorithms that enable authentication of individual users to specific accounts and roles with associated permissions, and that track failed authentication attempts for intrusion detection security; algorithms for authorizing individual users/customers to access and use only their devices and associated data; algorithms for detecting when security might be compromised anywhere in the system and taking action once security is believed to be compromised such as locking out a user or customer, denying access to devices or data, locking out parts of the system globally or by customer and flushing all security keys requiring re-initialization throughout the system of all security subsystems; algorithms for creating sets of devices that meet pre-defined conditions then proactively and remotely managing these devices including resetting, updating firmware, updating operational parameters, triggering on-demand information delivery, troubleshooting issues, overriding operation for prescribed periods of time, etc.; analytical algorithms that operated on aggregated information at the OLN manufacturer's network operations center and provide customers with all manner of operational and environmental insights; algorithms that allow a network of light units to manage power being pulled from the power grid or placed back onto the power grid, such as: algorithms that allow a network of light units on the grid to put power onto the grid a desired times, either as certain criteria are sensed and met on the grid, or via a command from a central command center or a Network Operation Center (NOC); and algorithms to draw power from the grid at desired times, as certain criteria are sensed and met on the grid, or via a command from a NOC.

Algorithms to vary the control signal to the load(s) to test its operation (i.e. to test the ability of the light to run full brightness and dim down to various dimming levels).

Regarding community assistance and relations, or advertising to the community: algorithms relating to advertising and other information that may be announced and/or displayed on one or more of the nodes/light units of a OLN, preferably powered by renewable systems and energy storage systems that are also powering lights for the community: methods for leveraging the convenient locations of street lighting and the surface area provided to offer advertising inventory; methods and algorithms for providing programmable inventory on a light unit that includes advertising inventory and time-based rotation of ad inventory; methods and algorithms for selecting collections of light units that meet various criteria (e.g., location, amount of foot traffic based on motion triggers, average monthly temperature) and then delivering programmable ad inventory to light units meeting the criteria; methods and algorithms for wirelessly determining additional context from a passerby (e.g., mobile device brand and service provider) and enabling more targeted advertising based on this additional context; and algorithms for determining the direction a passerby is heading, identifying light units in that direction and then streaming advertising across light units along the passerby's path to overcome bandwidth limitations, provider a longer and richer ad experience or both.

Algorithms regarding/providing Wi-Fi hotspots: methods for including mobile broadband routers on light units in order to offer community Wi-Fi hotspots; algorithms for leveraging sensor information (e.g., motion) and system parameters (e.g., time of day, available battery energy) to enable or disable Wi-Fi hotspot capability; and methods for enabling/disabling and changing the behavior of Wi-Fi hotspots remotely, from a network operations center.

Algorithms regarding/providing financial transactions: methods and algorithms for securely receiving, aggregating, uploading and reconciling financial transactions from RF devices within range.

There is a collection of structural elements, methods, and algorithms that reside on preferably each device.

Solar Device: device design elements and algorithms for maximizing solar collection capabilities: relationship between light unit height, location on solar isolation map and amp-hours; relationship between light unit diameter, location & amp-hours; and relationship between PV efficiency. Hardware and interfaces for configuring power delivery options like voltage and current during manufacturing and/or installation to support multiple different device activities (e.g., lighting, security gate, broadband wireless.). Configurable wiring harness(es) and routing to support multiple device activities powered on-device (e.g., lighting, video and broadband wireless at the top of the device, USB attachments at ground level) and off-device (e.g., security gate and sensor fence.). Granular operational and environmental data logging to correlate solar collection and charge characteristics as a function of location and environmental information (e.g., average daily sunshine, temperature, pressure, humidity.). Algorithms for determining when and how much energy to invert back onto the grid as a function of device operational and environmental parameters. Algorithms for minimizing energy consumption as a function of device operational and environmental parameters as well as sensor triggers like photo cell and motion. A separable solar engine kit that includes solar collector, charge controller, energy storage, delivery and wireless monitoring backhaul; along with all the connectors—mechanical, electrical & software/firmware interface—to enable third parties to install our solar engine on other types of devices.

Light Delivery Stack: Delineate light delivery into distinct layers with unique parameters that can be independently adjusted to meet overall intensity and shape requirements cost effectively. A whole-luminaire, high efficiency lens that integrates diffusion technology for smoothing light distribution where there are hotspots with Fresnel lens technology to direct light at precise wide angles to achieve standard IFS luminaire distribution types I thru V and sufficient environmental protection to achieve IP65/66 approval. A luminaire mounting plate with highly adjustable LED module mounts that enable cost effective, highly variable lighting patterns outside of the standard IFS types I thru V, along with algorithms for how to adjust modules to achieve a given light distribution.

Modularity: Mechanical modularity of devices that allows different activities to be attached and configured easily at manufacturing time, installation time or even in the field post install. Harness, conduit and wiring that enable batteries to be located off-board, meaning off the device yet wired into the device. Well defined abstractions with interfaces to allow wireless connectivity hardware and protocols to evolve over time and be upgraded without affecting the architecture or higher-level applications relying upon this connectivity.

Diagnostics & Repair: Algorithms to diagnose which energy storage unit(s) is bad or failing. Algorithms to determine whether the sensing devices are failing or failed. Algorithms to determine whether any of the light emitting devices (i.e. LED modules) are failing or failed. Algorithms to determine whether the AC/DC power converter is failing or failed. Algorithms to reset AC/DC power converter (either wirelessly or via hardwire connection). Algorithms to determine whether the Charge Controller (device converting energy from the Power Generator to energy to be stored or consumed) is failing or failed. Algorithms to reset Charge Controller (either wirelessly or via hardwire connection). Algorithms to determine whether the Power Generator (i.e. Solar Panel) is failing or failed. Algorithms to determine whether the power inverter is failing or failed. Algorithms to reset power inverter (either wirelessly or via hardwire connection). Algorithms to determine whether the control board is failing or failed. Algorithms to reset control board (either wirelessly or via hardwire connection); Algorithms to test various subsystems and/or subroutines on the control board (either wirelessly or via hardwire connection); Algorithms to put selected subsystems and/or subroutines in selected states (either wirelessly or via hardwire connection); and Algorithms to reset various subsystems and/or subroutines on the control board, including entire control board (either wirelessly or via hardwire connection). Algorithms to determine whether other devices (such as a security camera) are failing or failed. Algorithms to reset those other devices (either wirelessly or via hardwire connection)

Supportability: All operational parameters that affect how the systems and algorithms behave are abstracted out of the code, leaving behind variables in the code that are evaluated at system start. Operational parameters are stored separately from code in a profile that is easily read and processed by the code. The profile should be easy to replace in its entirety. Individual values for operational parameters in the profile should be easy to replace. On system restart or reset, all systems and algorithms flush their values for operational parameters then re-read and re-process operational parameters from the profile. A method for resetting the device at ground level (i.e. standing on the street), like a reset button. Pushing this button is the equivalent to power cycling the system, which causes all hardware, firmware and software to re-initialize, re-read and re-process all operational parameters. A method for indicating device system status, like a 3-color light or set of lights (e.g., green, yellow, red) at ground level that conveys one of three states: operating properly, operating but there is an issue needing attention, and not operating. This provides ground level feedback regarding whether to push the reset button as well as whether or not pushing the reset button resolved the issue. A method for providing a ground-level memory card reader (e.g., CompactFlash, SmartMedia). Memory card reader is bootable, meaning on reset the card reader is checked for a set of operational parameters and if exists, these operational parameters are used instead of any others that may be onboard. System logging persists on a memory card in the ground level slot so that the card can easily be replaced, with logging data taking back for more thorough analysis than can reasonably occur in the field. Amount of memory for operational parameters and logging is easily increased by replacing lower capacity card with higher capacity card over time. Methods and algorithms for creating modularity of systems on the device. Facilitate unit testing as the number of components increases. More easily enable in-field, blackbox replacing as a cost effective support strategy in the field. Replaced modules are sent back to a certified service rep for troubleshooting, repair and recirculation. Methods and algorithms for enabling an expandable bus architecture on the device to enable in-field hardware feature expandability over time (e.g., new sensor, high bandwidth radio, video camera).

Environmental Sensing: Methods for collecting and logging environmental data (e.g., luminosity, temperature, humidity, pressure, wind speed) for later use and correlation with other information like device operational parameters. Methods for adding, configuring and enabling sensors on a device during manufacturing, installation and/or in the field.

Smart Wireless Mesh: The basics of mesh networks are known by mesh providers, such as self-organizing, repairing, route optimization via feedback, etc. However, some unique innovations occur in how mesh networking is used, for example, the following features.

Mesh: Methods for providing different backhaul channels to meet the characteristics of different types of device data (e.g., low bandwidth, best efforts, open channel; high bandwidth, guaranteed delivery, VPN channel). Algorithm for selecting a backhaul channel based on the characteristics of a specific type of device data, that is, data-driven backhaul channels (e.g., for small size, non-critical, insensitive data, use low bandwidth, best efforts, open channel; for streaming, real-time sensitive data, use high bandwidth, guaranteed delivery, VPN channel). Method and algorithms for periodically polling the mesh, checking differences in the responses, using these differences to determine when individual devices are unresponsive and then taking action: sending alerts, repurposing a nearby functioning device to assume unresponsive device's role, dispatching field support to reset or troubleshoot if necessary, etc.

Quarantine: A method for allowing formerly unknown devices to join a mesh, but to limit the functionality of the device—and therefore its risk to the overall system—until the device successfully passes several well defined phases of quarantine. Algorithms for describing what behavior and conditions must be met for each phase of quarantine and then determining when a specific unknown device successfully meets these conditions.

Collective Intelligence: A method for sharing information wirelessly with a collection of devices, having each device in the collection perform tasks to make one or more determinations, and then sharing these determinations with other devices in the collection yielding a result that causes a change in the behavior of a collection (e.g., two or more lighting devices determine a walker's direction and speed and then light the way ahead of the walker.). An algorithm for lighting the way ahead of a moving object (e.g., walker, automobile.). An algorithm for pointing a POV video camera in the direction of meaningful activity and following that activity as it moves. An algorithm for using motion triggered lighting across a large collection of lighting devices as a way of indicating where potentially meaningful activity is occurring (e.g., border crossing, college campus.). An algorithm for targeting advertisements to devices that follow an individual user as they move. Algorithms around how, where and how redundantly to register a device's capabilities on a network. Algorithms for determining connectivity issues on the network, routing around issues, repairing issues and reestablishing routes once repaired. Algorithms for favoring efficient routing, penalizing inefficient routing and adjusting both over time based on changeable definitions of efficiency. Algorithms for locating and sharing resources on the network as resource availability and location changes over time. Algorithms for securing the network against unauthorized network joins and ensuring intra-network communications cannot easily be intercepted and interpreted. Algorithms for using monitoring events across a population of devices to determine a coordinated action to take like lighting the way ahead of a walker along a pathway or turning on a video camera based on triangulation of multiple device motion sensors. Algorithms that detect motion (direction and velocity) and estimate the future direction and location of the moving object as a function of time. Algorithms that activate devices based on the anticipated location of the moving object (i.e. turning on or brightening lights or turning on/waking up security cameras ahead of a moving car or moving person.). Algorithms for determining the location of a device based on known fixed locations and triangulation of multiple device radio signals. Algorithms that allow devices in a network to look for and sense different sensors that come into range of the wireless sensor (s) on the devices. Algorithms that allow devices in a network to identify and categorize the different types of sensors that come into range of the wireless sensor(s) on the devices.

Remote Troubleshooting: A method and algorithms for periodically querying a population of devices for connectivity, comparing these snapshots differentially and determining when individual devices have lost connectivity. A method for remotely resetting a device, which has the effect of cycling the power on the device, flushing all runtime memory and then reloading and restarting all systems on the device.

Event Management: Algorithms for monitoring and storing discrete and continuous triggers, interpreting triggers and translating them into events to be published. Algorithms for subscribing to and receiving events with specified attributes as a way of performing a task in response to a published event. Algorithms for interpreting one or a collection of conditions, assessing their severity and then determining whether a warning or error condition exists. Algorithms around scheduling jobs at predefined times and/or with predefined frequencies to perform tasks. Algorithms enabling the way an event gets treated throughout the system to be dictated by the classification and characteristics of the event itself. Algorithms for aggregating events over populations of devices, rolling up event information based on criteria, interpreting low-level event information and using it to create new higher-order events. Algorithms involving securely bridging a low-power, low-bandwidth network and a medium-power, high-bandwidth network, or providing secure gateway capabilities between the two networks. Algorithms for aggregating information across populations of devices and securely delivering this information through a broadband wireless infrastructure to a network operations center. Algorithms for guaranteed or best-efforts delivery of information to the network operations center based on the classification of the information.

Content Services: Methods and elements for delivering content services via the OLN are described below, which content services may be delivered by a single lighting unit of the OLN but more preferably are delivered by a network of multiple lighting units of OLN(s). Delivering said content services may be in one or more directions, for example, gathering of information from a population (multiple) networked light units for transmittal preferably to a master light unit and then to a control station for processing and/or use, or (in the opposite direction) dissemination of information, advertising, alarms, or other content by the control station to the master light unit and then to one or more of the slave light units in the network.

Monitoring: Methods for setting thresholds for values generated by devices or populations of devices that when met, cause actions to be taken like sending an email or text alert, raising other events, etc.

Management: Methods for defining a task or set of dependent tasks to be delivered to populations of devices and then executed. Methods for defining jobs, comprised of a task or group of dependent tasks that can be scheduled for delivery and execution to a population of devices. Algorithms around creating and managing user/customer accounts and passwords with associated roles and permissions that span different kinds of customers and operators. Algorithms that enable authentication of individual users to specific accounts and roles with associated permissions, and tracks failed authentication attempts for intrusion detection security. Algorithms for authorizing individual users/customers to access and use only their devices and associated data. Algorithms for detecting when security might be compromised anywhere in the system and taking action once security is believed to be compromised such as locking out a user or customer, denying access to devices or data, locking out parts of the system globally or by customer and flushing all security keys requiring re-initialization throughout the system of all security subsystems. Algorithms for creating sets of devices that meet pre-defined conditions then proactively and remotely managing these devices including resetting, updating firmware, updating operational parameters, triggering on-demand information delivery, troubleshooting issues, overriding operation for prescribed periods of time, etc. Analytical algorithms that operated on aggregated information at an network operations center and provide customers with all manner of operational and environmental insights. Algorithms that allow a network of devices to manage power being pulled from the power grid or placed back onto the power grid. Algorithms that allow a network of devices on the grid to put power onto the grid a desired times, either as certain criteria are sensed and met on the grid, or via a command from a CMS or a Network Operation Center (NOC). Algorithms to draw power from the grid at desired times, as certain criteria are sensed and met on the grid, or via a command from a CMS/NOC. Algorithms to vary the control signal to the load(s) to test its operation (i.e. to test the ability of the light to run full brightness and dim down to various dimming levels).

Visualization: Algorithms for placing devices on a map based on precise location, and then overlaying weather, insolation, energy cost, traffic, safety and other meaningful data over these mapped devices. Methods for graphically illustrating key monitoring metrics for devices (e.g., KPI, ROI) in a dashboard. Methods for enabling the distribution of summary monitoring information on populations of devices to other websites as widgets.

Analytics: Methods and algorithms for quickly searching, refining and sorting sets of devices based on device attributes. Methods for correlating attributes across large populations of devices and then deriving insights based on the correlations.

Some embodiments of the invention, therefore, may be described as autonomous outdoor lighting systems according to any of the features described herein, Energy production (such as solar), storage of energy, and control of the outdoor lighting, its light units, and the mesh network for said light units may be included in the preferred embodiments. Wireless communications channels (WCC) give the ability to provide wireless connection of light units to the internet via wireless modems in each individual light unit ("slave" light unit), with a "master" or coordinator light unit transmitting data via cell phone or satellite radio to master station at connection to internet. The WCC also enables the use of both high bandwidth & low bandwidth capabilities (channels) that can be selected based on individual system/network requirements. High bandwidth speed is preferably greater than or equal to 11,000 kbts (kilobytes per second) and low bandwidth speed is preferably 20-250 kbts (kilobytes per second). For example, under normal conditions, the low bandwidth channel is utilized to conserve energy of the system. Upon the detection of an event (motion sensor activated), the high bandwidth mode is then employed (turn on camera). Also, the preferred embodiments may be self-Acting, with event "awareness", wherein actions of each individual light unit are taken based on that light unit's "view" of its local sensor data (solar collection data, motion sensor data, wind or barometric pressure, etc. Cooperative/Community Actions may also be included in the preferred processes of the light units and network, wherein the operation of the light unit(s) (and attached devices/systems) change/respond with respect to adjacent light units within the community. This includes small network actions (10-100 light units), city-wide actions, and/or large area networks, and part of this includes the "self-organizing" & "self-recognition" of new light units joining the network characteristic of Mesh or ZigBee networks. Remote Configuration is also preferably included in the processes of the light units/network, wherein changes to the wireless controller can be done remotely via the internet web interface, which this includes new programming, firmware, upgrades, troubleshooting and repair (system reset if required, etc. Light unit/Node Management may include actions needed for "light the way", power delivery to/from the grid, and/or content services. The preferred light units and network are made with a large amount of modularity, for example, by using an "open" architecture, which may include the utilization of standard open protocols, hardware and architecture, with universal bussing that allows the implementation of new systems, and/or devices that may be needed on the light units. In some light units/networks, financial transactions may be communicated via RF, security cameras may provide data and video to law enforcement, and WI-FI routers may be provided. Both for "on-light unit" devices and "off-light unit" devices, the long-term supportability of the system is provided by the control system self-healing and repair functions, together with the capability of ground level access and repair. Security (System/Network protection) s designed to limit connectivity and access based on who is attempting to connect to the network; new devices will immediately connect to the network, but under a systematic quarantine period to determine device type & authorization level.

Figure 3:
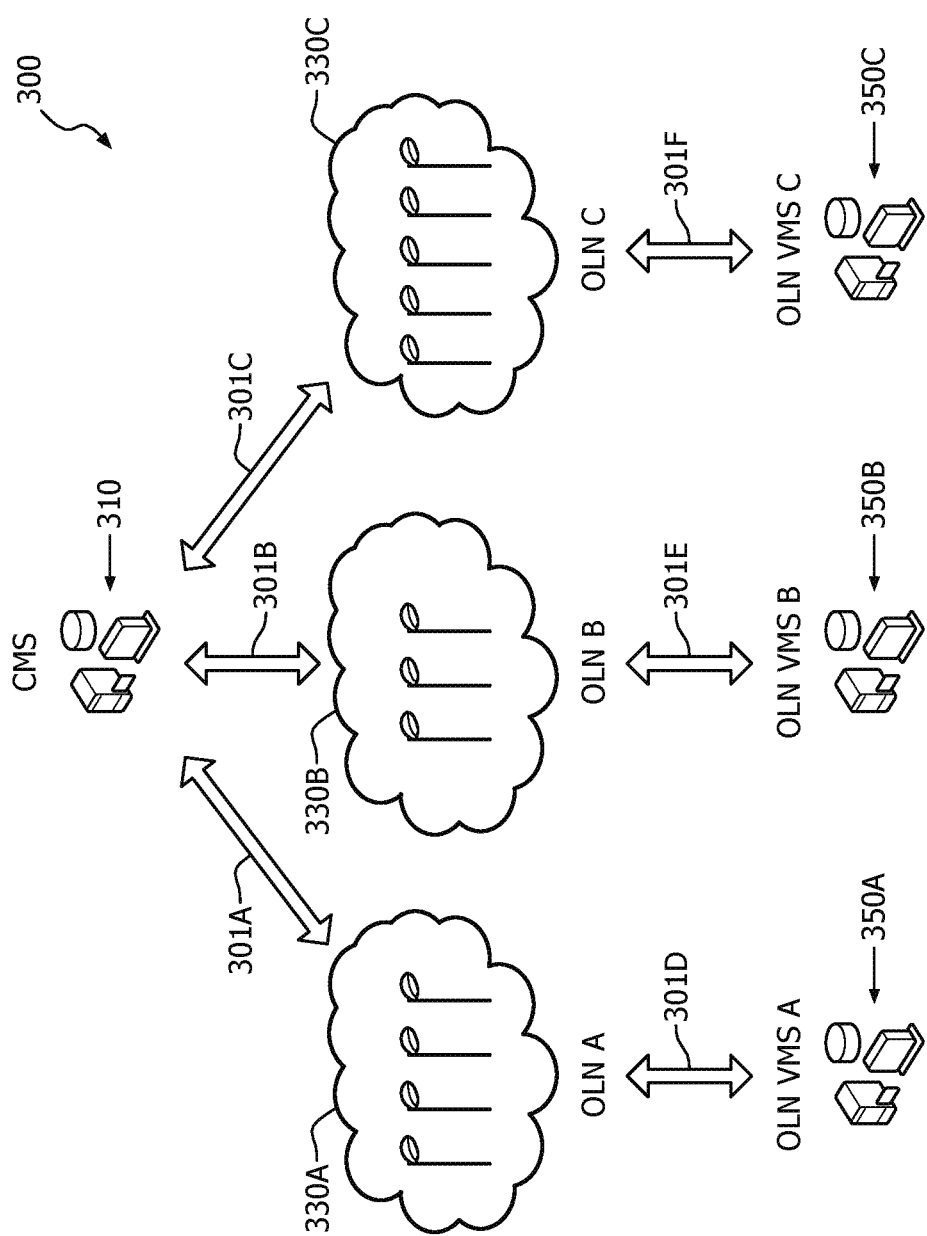
FIG. 3 illustrates an embodiment of a multi-vendor OLN system in accordance with embodiments of the present system.

FIG. 3 is an embodiment of a multi-vendor OLN management system 300. The management system 300 includes a single CMS 310 in communication with a first OLN 330A via communication link 101A, a second OLN 330B via communication link 301B, and a third OLN 330C via communication link 301C. The management system 300 also includes a first vendor management systems VMS 350A in communication with the first OLN 330A via communication link 301D, a second VMS 350B in communication with the second OLN 330B via communication link 301E, and a third VMS 350C in communication with the third OLN 330C via communication link 301F. Each of the OLNs 330A-C is topologically interposed between the CMS 310 and a respective of the VMSs 350A-C. Communication links 301A-F may include, for example, one or more wireless, wire/cable, and/or fiber optic links. The CMS 310 and each of the VMSs 350A-C may include a computer such as a desktop computer, a handheld computer device, a server, and/or a bank of servers. The computer may execute computer program instructions that implement one or more of the functions specified in this application that are associated with such device. The CMS 310 may include at least one user interface allowing the customer to perform functions related to the CMS 310 and each of the VMSs 350A-C may include a separate at least one user interface allowing the vendor to perform functions related to its respective VMS 350A-C. In some embodiments the CMS 310 may provide different control and/or information capabilities to certain users. For example, in some embodiments a hierarchical control model may be utilized where authorities at different levels access the CMS 310 with different priorities. As an example, different management levels (e.g., local, city, state, and national) could have control and/or information capabilities that are tailored for the particular management level.

Each of the OLNs 330A-C may include one or more direct communication OLN devices such as lighting units, segment/local controllers, and/or other associated assets (e.g., lighting fixtures, sensors, light sources, cameras, storage devices, power sources) that are equipped with control and communication capabilities to enable communication with the CMS 310 and/or with a respective of VMSs 350A-C. Each of the OLNs 330A-C may also optionally include one or more managed OLN devices such as lighting units, sensors, lighting fixtures, light sources, cameras, and/or power sources that may be controlled and managed by the CMS 310 and/or a respective of VMSs 350A-C, but cannot establish direct connection with the CMS 310 or a respective VMS 350A-C. For example, a managed OLN device may be controlled by the CMS 310 and/or a VMS 350A-C via a direct communication OLN device (e.g., a segment controller) that is in communication with the CMS 310 and/or a VMS 350A-C and that controls the managed OLN device based on input received from the CMS 310 and/or a VMS 350A-C.

Generally speaking, the CMS 310 communicates with each of the OLNs 330A-C to remotely control and manage certain aspects of the devices of the OLNs 330A-C, while the VMSs 350A-C connect to their respective OLNs 330A-C and manage other aspects of the devices of the OLNs 330A-C. For example, the CMS 310 may communicate with the OLNs 330A-C to control and manage the lighting behavior (e.g., switch on/off, set dimming level, set color level, and/or set lighting schedule) of one or more light sources of the OLNs 330A-C (either directly or via one or more lighting unit, segment controller, etc.). Also, for example, the CMS 310 may communicate with the OLNs 330A-C to control and manage measurements and feedback configuration of one or more OLN devices (e.g., receive and manage measurements and/or feedback from one or more OLN devices, alter measurement and feedback status of one or more OLN devices, and/or alter measurement and feedback reporting frequency of one or more OLN devices). Also, for example, the CMS 310 may also communicate with the OLNs 1330A-C to control and manage one or more OLN devices (e.g., manage information of OLN controllers, lighting fixture, sensors, cameras, and/or power sources; switch on/off OLN controllers, lighting fixture, sensors, cameras, and/or power sources; and/or configure controllers, lighting fixture, sensors, cameras, and/or power sources).

The VMSs 350A-C may manage other aspects of the OLNs 330A-C. For example, the VMSs 1350A-C may communicate with respective of the OLNs 330A-C to perform OLN commissioning of one or more devices of the OLNs 330A-C (e.g., assigning geographical information to the device, assigning initial installation location information to the device, assigning initial configuration information to the device, and/or assigning relationships between multiple devices). Also, for example, VMSs 350A-C may communicate with respective of the OLNs 330A-C to manage the OLN (e.g., optimize communication between OLN devices, identify and troubleshoot connectivity issues, and/or install software updates). Also, for example, the VMSs 350A-C may also communicate with respective of the OLNs 330A-C to provide security management for the OLN (e.g., verify newly connected OLN devices, detect security breaches, and/or correct security issues). Also, for example, the VMSs 350A-C may also communicate with respective of the OLNs 330A-C to control certain vendor specific functionality of one or more of the devices of the OLN. This bifurcation of aspects of the control and management of an OLN between the CMS and VMS enables a customer to control and manage certain aspects of multi-vendor OLNs, while leaving many vendor-specific aspects of the control and management of the multi-vendor OLNs up to the VMSs. Certain aspects of the control and management of an OLN may also optionally be dictated by either the CMS or the VMS. For example, the CMS may be able to set reporting parameters in certain situations (e.g., at setup and/or in an override situation).

Figure 4:
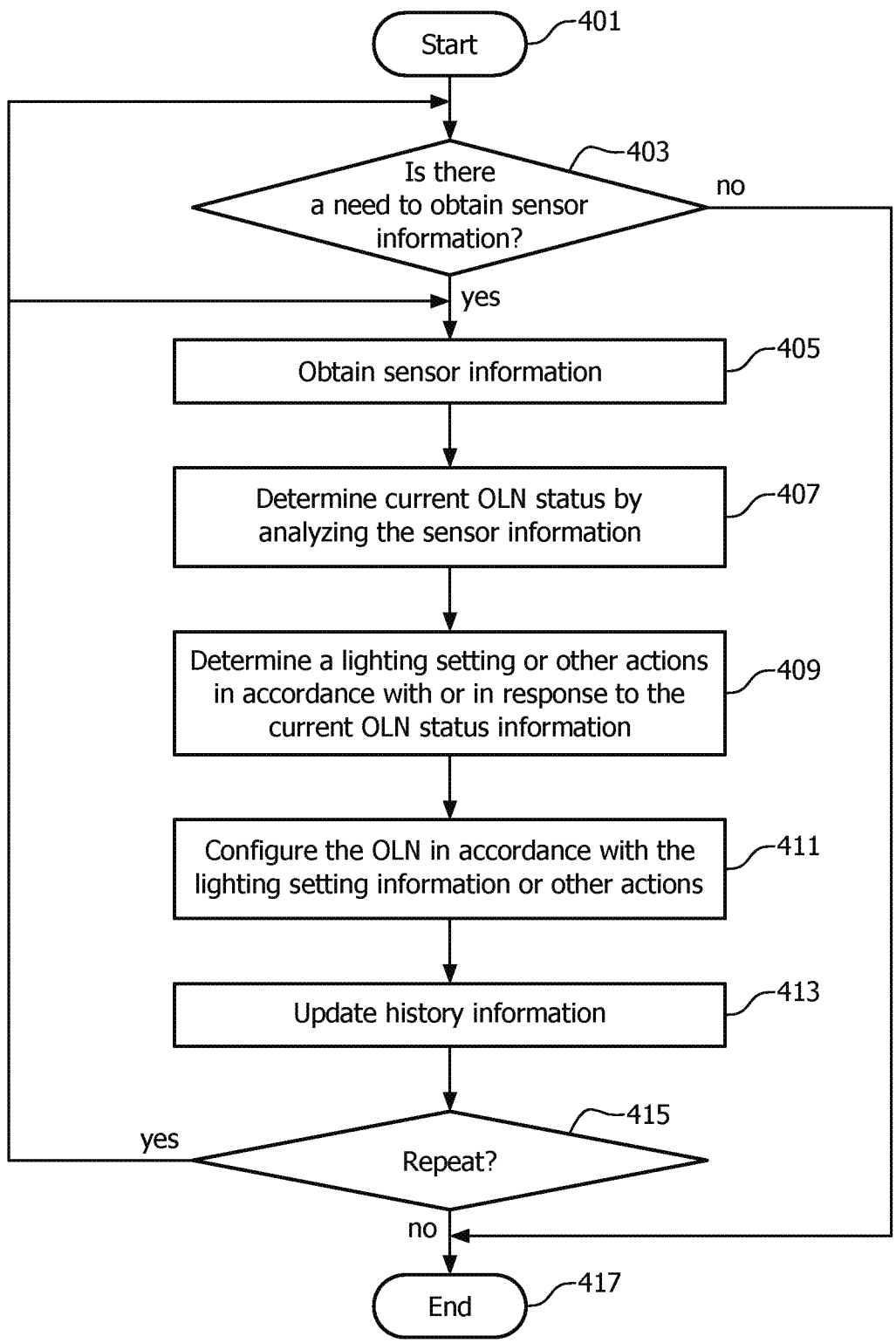
FIG. 4 shows a flow diagram that illustrates a process in accordance with embodiments of the present system.

FIG. 4 shows a flow diagram that illustrates a process 400 in accordance with embodiments of the present system. The process 400 may be performed by a system as shown in FIGS. 1C & 2. The process 400 may include one of more of the following steps. Further, one or more of these steps may be combined and/or separated into sub-steps, if desired. In operation, the process may start during step 401 and then proceed to step 403.

During step 403, the process determines if information is needed or requested by a user, the CMS, other light unit 206-N, etc.). This may be in response to: (1) an information request form a user interface apparatus 122, (2) a routine status or maintenance request from CMS 102, (3) an event detection trigger, such as a vehicle or object entering the lighting system 200 area, etc. If this determination is Yes, then the process proceeds to step 405.

During step 405 the process may obtain some or all sensor information from sensors 226, which may include information related to the status of conditions in the vicinity of one or more luminaires in accordance with embodiments of the present system. Furthermore the process may obtain information from Resources 112, such conditions may include: weather conditions, traffic conditions, hazardous or dangers conditions, monitoring/tracking of objects, information requests from user interface devices, the Internet, etc. Accordingly, the process may obtain information which may, for example, include one or more of image information, temperature information (e.g., ground and/or air), Doppler radar information, pressure information, object speed and/or direction information, database information, historical data, location information, etc. After obtaining the information, the process may continue to step 407.

During step 407, the process may determine current OLN status by analyzing the information. For example, the process may analyze image information, acoustic information, and determine that a car accident has occurred, or that brake-in/robbery has occurred in a building near a luminaire/sensor of the OLN; or it could analyze pressure information and radar information, and determine that it is currently raining. For example, the current status information from Resources 112 may include information related to the current weather conditions in the vicinity of reporting sensors such as one or more of precipitation (e.g., rain, snow, fog, drizzle, ice, etc.), a rate of precipitation (e.g., 0.02, 2, etc., inches of rain per hour obtained by radar, collector, and/or image based sensors), humidity (bar), barometric pressure (inches-mercury in-hg), dew point, ambient illumination (e.g., dark such as nighttime which may also be determined together with or indecently with time information on a current time), etc. Moreover, the process may process image information using an image recognition algorithm or other digital signal processing technique and determine that it is raining and dark and from corresponding current [weather status] information. The process may also determine ground and/or air temperatures, etc. To determine the current [weather status] information, the process may use any suitable method such as a weather forecast application which may be run locally or at a remote location (e.g., by a third party application, etc.), etc. Accordingly, the process may forward the processed or unprocessed sensor information to a weather forecast application and receive information related to the current weather status (e.g., rain, dew point, expected weather pattern (e.g., clearing, becoming cloudier, colder, etc.) etc.). Further, it is envisioned that the process may obtain the other status information (e.g. traffic information) from a third party application. After completing step 305, the process may continue to step 407.

During step 409, the present system may determine a lighting setting in accordance with or response in to the current status information or take other actions, such as provide an alerting signal to users/vehicles in the area or send information/messages to one or more user interface apparatus 122 or input/output devices 239, or provide a coordinated lighting setting response using two or more light units 206-1, sensors 226, input/output devices 239-1/user interface apparatus 122-1. The lighting setting may, for example, control the profile, illumination pattern(s), intensities, spectrum(s), polarization(s), frequencies (e.g., for flashing or continuous lighting, etc.), etc., of illumination provided by one or more of the one or more light units. Accordingly, the appropriated lighting system 200 response may be determined using an algorithm and/or a look up table or manually by a user.

Accordingly, the present system may set the lighting setting based upon the status information. For example, if the identified status is determined to be Fog (e.g., foggy), the process may set the light profile to spread the intensity to normal, the color to yellow and the frequency to 90 Hz (e.g., not flashing). The illumination pattern may include a normal and a spread pattern. The normal profile may define a normal area (e.g., a matrix) having a normal shape and/or size while a spread profile may have, for example, the same shape but may have a bigger size (or may have a different shape, if desired). The lighting settings may be set and/or updated by the system and/or by the user. For example, with respect to the Fog status setting, the user may set the color frequency to Red and may set the frequency to 20 Hz such that a flashing red light will be perceived by an individual when noticing light output from a corresponding luminaire. However, it is also envisioned that the system may use historical information to modify information in a lighting setting table. After determining the lighting setting, the process may form corresponding lighting setting information which may be transmitted to, and/or received by CMS 102 and/or one or more of the selected light units of a plurality of light units in the lighting system, if desired. After completing step 409, the process may continue to step 411.

During step 411, the present system may configure the OLN, in particular the selected light units to illuminate in accordance with the lighting setting information or take other actions, such as provide an alerting signal (for example using the input/output devices 239) to users/vehicles in the area or send information/messages to one or more user interface apparatus 122, or provide a coordinated lighting setting response using two or more light units 206-1, sensors 226 or input/output devices 239. For example, LED sources may be configured to output illumination patterns, intensities, colors, color intensities, color spectrums, and/or frequencies in accordance with the lighting setting information. The illumination patterns may be determined using matrixes which may indicate intensity distribution over area. Moreover, different illumination sources (e.g., gas lamps, LEDs, etc.) may be selected based upon the illumination settings. After completing step 411, the process may continue to step 413.

During step 413, the present system may form and/or update history information (e.g., a statistical information) of a memory of the present system in accordance with the determined weather status, the sensor information, day, date, time, user travel patterns, etc. which information may be used at a later time, for example to provide optimized directional path guidance that considers historical user travel patterns (e.g. for day and night travel) as well as safety factors, crime reports from resource server 112. After completing step 413, the process may continue to step 415.

During step 415, the present system may determine whether to repeat one or more steps of the process. Accordingly, if it is determined to repeat one or more steps of the process, the process may continue to step 403 (or to another step which is desired to be repeated). Conversely, if it is determined not to repeat one or more steps of the process, the process may continue to step 417, where it ends. The process may be repeated at certain periodic and/or non-periodic time intervals. By repeating the process, history information may be accessed and used to determine, for example, rate of change of the sensor information. This information may be used to determine and/or tune appropriate responses in lighting system 200 to various situations and events.

Figure 5:
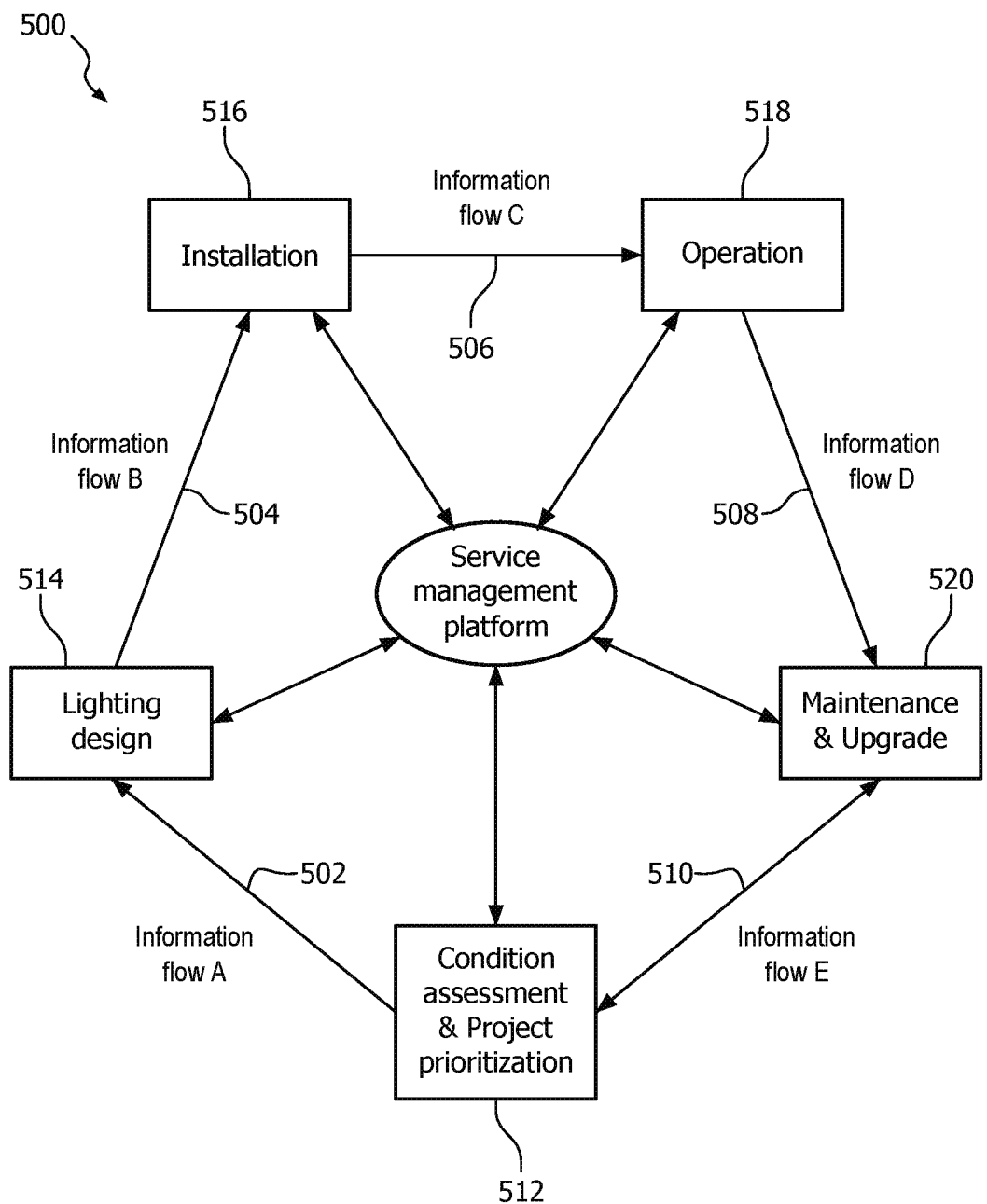
FIG. 5 shows a flow diagram that illustrates a process in accordance with embodiments of the present system for the integrated service/management platform and information flows.

FIG. 5 shows a flow diagram that illustrates a process 500 in accordance with embodiments of the present lighting platform for the integrated service/management platform and information flows within service platform server 2, which represent the interactions between the various stages/modules of design, deployment, operation and customization of lighting infrastructure. The process 500 may be performed by a lighting platform as shown in FIGS. 1A & 1B. The process 500 may include one of more of the following steps. Further, one or more of these steps may be combined and/or separated into sub-steps, if desired.

Information flow A 502: information exchange between condition/inventory assessment unit 512 and design/planning unit 514. Condition/inventory assessment data may include asset condition plans, project prioritization plans, general information about existing infrastructure, such location, type, model, manufacturer, capabilities, operational conditions, etc. It may be collected through mobile/portable devices in the field or through existing documents/files, such as files in a city information database, where available. It should be noted that the direction of the information flow A is only a conceptual representation, whereas the actual information may be communicated through the service platform server 2.

Figure 7:
FIG. 7 shows an inventory assessment application that can be used by to record existing lighting inventory in the process in FIG. 5.

FIG. 7 shows an exemplary inventory assessment application that can be used by to record existing lighting inventory in the process in FIG. 5. The inventory assessment application can be used by either lighting engineers or city residents. The user can go to the field and use the application to add a new light point at the current geo-location. The application also allows the user to add a new light point at an arbitrary location on the map (e.g., by double tapping on the map). For each light point, the user can input some basic attributes such as luminaire type and the height of the light pole. By using image processing techniques, these attributes may also be automatically extracted from the picture taken for the light point.

The application shows not only the light points added by the current user, but also those added by other users. While privilege users may remove or modify all the light points shown on the map, normal users may only remove or modify the light points added by themselves, however, a normal user may flag a light point added by others if she/he thinks some information is inaccurate. Privilege users then may verify the information for a light point if it receives lots of flags. Meanwhile, normal users may be ranked and gain trustiness based on their behaviors such as the accuracy of the input information.

Information flow B 504: information exchange between design/planning unit 514 and installation unit 516. The output of the design/planning unit 514 will include design/planning plans and specification of solutions comprising devices (luminaires, controls, sensors), capabilities/features (e.g. dimming, motion/light/traffic sensing, communications, power sources, etc., and installation/commissioning instructions (e.g., which type of devices to be installed where, and device configuration parameters) . . . . The installation unit may also include further steps where it interacts with OLN vendors to customize order, manufacture and deliver products, as well as contractors to perform installation and commissioning of the system. The service platform server 2 coordinates the interaction with manufacturers/vendors/contractors and maintains an up to date record of the systems that have been installed. It also supports the initial commissioning of the system, where communication and initial device configuration is performed.

Information flow C 506: information exchange between the installation unit 516 and operation unit 518, which include the registration of installed devices on operation map, the operation plans and parameters such as dimming schedule, dimming zone specification (for group control, like a street, park), sensor-light association table, sensitivity of sensors, etc. After installation and commissioning, operational control over the system is handled to the proper users who can access the system through the same service platform used in the prior design/planning and installation steps.

Information flow D 508: while under normal operation, system data is collected and it is used to continuously maintain system operation plans as well as identify and recommend upgrades or improvements to operational behavior, and devices capabilities. For instance, burning hours and logs of user commands per light point can be used to determine an optimum maintenance/replacement schedule. System and methods described in application number PCT/IB2012/051737, entitled "OLN Light change/optimization system", publication number WO2012/143814, and incorporated by reference therein, can be used for the optimization.

Information flow E 510: In order to optimize the operation unit 518 and maintenance unit 520 of the system, feedback information and/or optimization plans may be needed, which can be provided by the condition assessment unit, in addition to measurement from operation unit 518 as of information flow D. Several assessment devices and application can be used to provide feedback data. Furthermore, methods to coordinate measurements described in WO2012/143814 can also be used to obtain feedback that is made available to other units through the service platform. The maintenance/upgrade unit could trigger major renovation— thus a new cycle of lighting service.

In addition the service platform server 2 may send commands to the central management system 102 to manage or reconfigure the one or more of the outdoor lighting networks 3-N based on any lighting service units updates or optimized plans.

Figure 6:
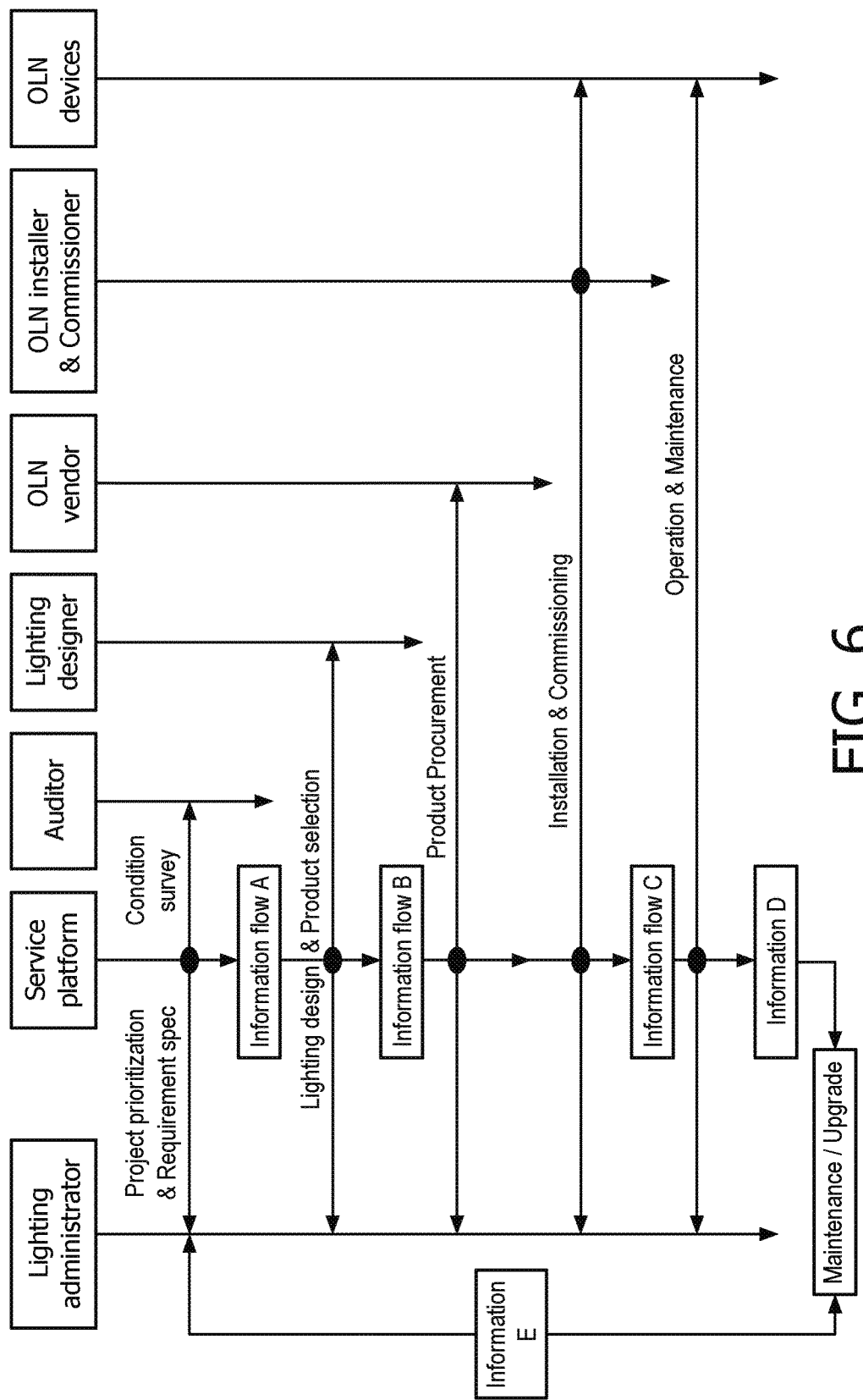
FIG. 6 shows a flow diagram that further illustrates the process in FIG. 5 and shows the interactions between entities and users of the process through the complete life cycle of a project from assessment, to operation/maintenance and upgrades.

FIG. 6 shows a flow diagram that further illustrates the process in FIG. 5 and shows the interactions between entities and users of the process through the complete life cycle of a project from assessment, to operation/maintenance and upgrades.

Figure 8:
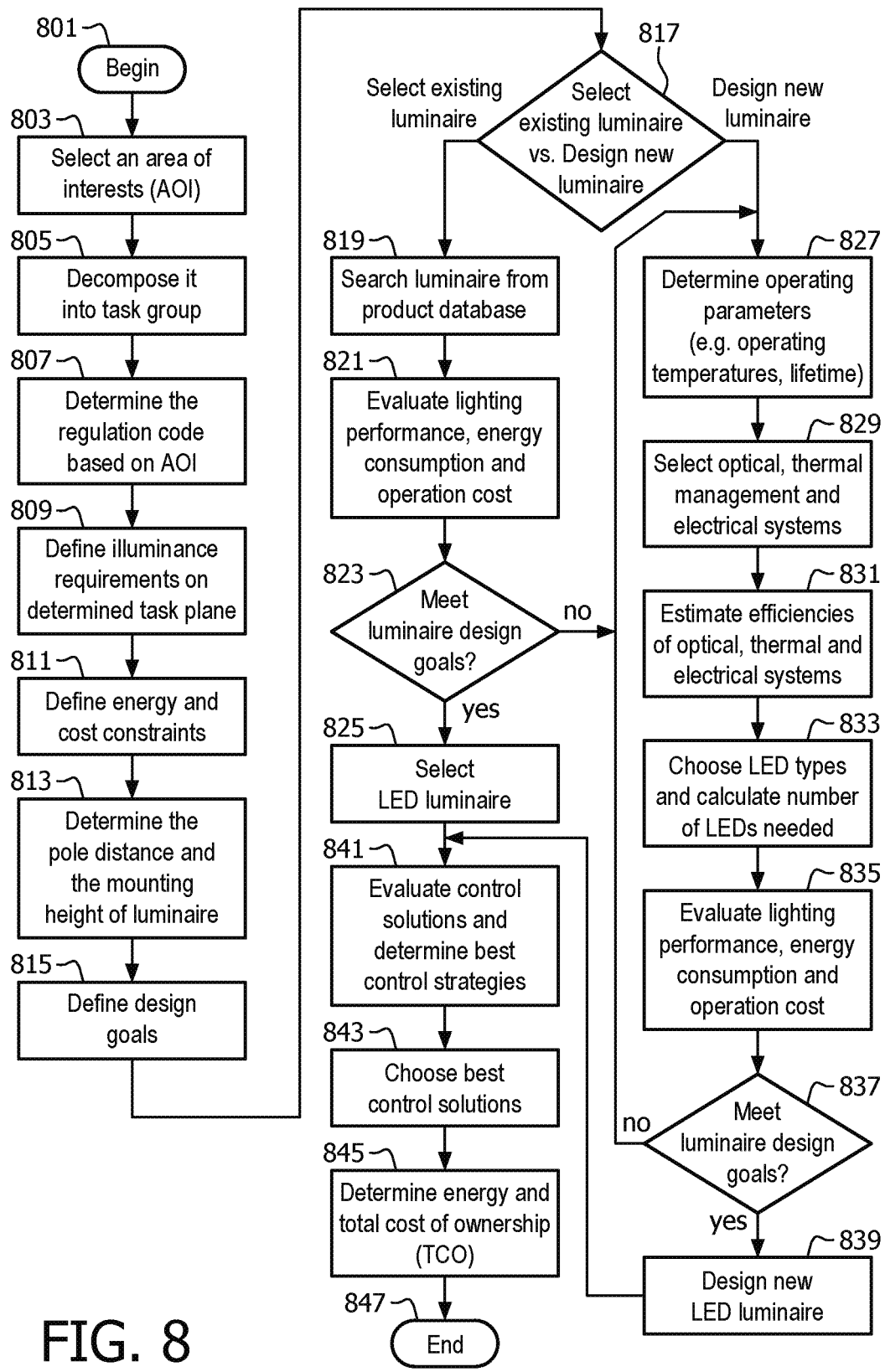
FIG. 8 shows an exemplary lighting design/planning process used in the process in FIG. 5.

FIG. 8 shows an exemplary lighting design/planning process used in the service platform server 2 in FIG. 5. The process 800 may include one of more of the following steps. Further, one or more of these steps may be combined and/or separated into sub-steps, if desired. In operation, the process may start during step 801 and then proceed to step 803. In step 803 an area of interest (AOI) is selected. In step 805 the AOI is decomposed into task groups. In step 807 the regulation codes are determined based on the AOI. In step 909 the illuminance requirements are determined for the task plane. In step 911 the energy and cost constraints are defined. In step 813 the pole distance and mounting height of the luminaires are determined. In step 815 the design goals are defined. In step 817 it is determined whether to use existing luminaires vs. designing new luminaires. If existing luminaires are used, step 819 searches for luminaires from a product database. In step 821, lighting performance, energy consumption and operation cost is evaluated. In step 823, it is determined whether the luminaire design goals are met. If yes, in step 825 the luminaires are selected. If no, the process proceeds to step 827, to design a new luminaire. In step 827, the operating parameters (e.g. operating temperatures, lifetime, etc.) are determined. In step 829, the optical, thermal management and electrical systems are selected. In step 831, the efficiencies of the optical, thermal and electrical systems are estimated. In step 833 the lamp types and numbers are selected/calculated. In step 835, the lighting performance, energy consumption and operation cost is evaluated. In step 837, it is determined whether the luminaire design goals are met. If not, the process returns to step 827. If yes, precedes to step 839, to implement the design of the new luminaire. In step 841, the control solutions are evaluated and the best control strategies are determined. In step 843 the best control solutions are implemented. In step 845, the energy and total cost of ownership (TCO) are determined. Step 847 ends the process.

Figure 9:
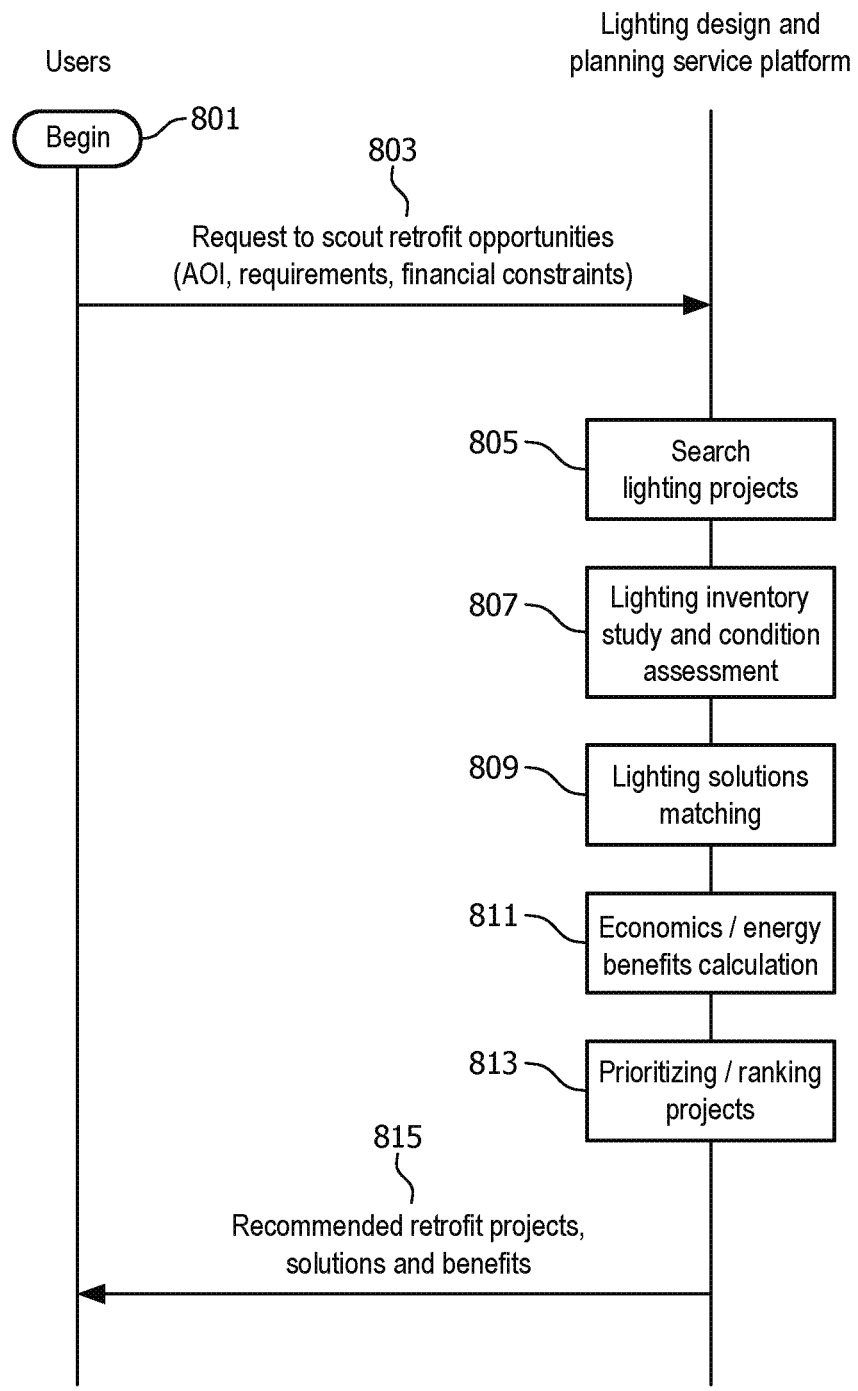
FIG. 9 shows an exemplary method to identify and prioritize projects based on assessment/inventory data used to in the process in FIG. 5.

FIG. 9 shows an exemplary method to identify and prioritize projects based on assessment/inventory data used to in the process in FIG. 5. The process 900 may include one of more of the following steps. Further, one or more of these steps may be combined and/or separated into sub-steps, if desired. In operation, the process may start during step 901 and then proceed to step 903. In step 903, a request is sent (by a user) to the service platform server 2 in FIG. 5 to determine retrofit opportunities, (e.g. AOI, requirements, financial constraints, etc.). In step 805, the service platform server 2 searches lighting projects. In step 807, a lighting inventory study and conditions assessment is performed. In step, 809, lighting solutions matching the request are determined. In step 811, an economics/energy benefits calculation is performed. In step 814, a prioritizing/ranking of the projects is performed. In step 815, recommendations are sent to the requesting user for retrofit projects, solutions and benefits.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A light management system for an outdoor lighting network system, comprising:
   a plurality of outdoor light units each including at least one sensor type, where each of the light units communicates with at least one other light unit;
   at least one user input/output device in communication with at one or more of said outdoor light units;
   a central management system in communication with light units, said central management system sends control commands to one or more of said outdoor light units, in response to received outdoor light unit status/sensor information from one or more of said outdoor light units;
   a resource server in communication with said central management system;
   wherein the central management system uses the light unit status/sensor information and resources from the resource server to determine an event occurrence, and in response reconfigure one or more of the lights units, provide information to the at least one user input/output device or initiate a predetermined action;
   wherein the sensor type is a light sensor and the received outdoor light unit status/sensor information is light reflection data from two or more light units, wherein the central management system processes the light reflection data and compares the light reflection data to a light reflection reference point for the respective light units, and determines reflection anomalies that indicates the event occurrence.

2. A light management system for an outdoor lighting network system, comprising:
   a plurality of outdoor light units each including at least one sensor type, where each of the light units communicates with at least one other light unit;
   at least one user input/output device in communication with at one or more of said outdoor light units;
   a central management system in communication with light units, said central management system sends control commands to one or more of said outdoor light units, in response to received outdoor light unit status/sensor information from one or more of said outdoor light units;
   a resource server in communication with said central management system;
   wherein the central management system uses the light unit status/sensor information and resources from the resource server to determine an event occurrence, and in response reconfigure one or more of the lights units, provide information to the at least one user input/output device or initiate a predetermined action;
   wherein the central management system in response to the event occurrence uses two or more user input/output device for directional path indicators.

3. A light management system for an outdoor lighting network system, comprising:
   a plurality of outdoor light units each including at least one sensor type, where each of the light units communicates with at least one other light unit;
   at least one user input/output device in communication with at one or more of said outdoor light units;
   a central management system in communication with light units, said central management system sends control commands to one or more of said outdoor light units, in response to received outdoor light unit status/sensor information from one or more of said outdoor light units;
a resource server in communication with said central management system;
wherein the central management system uses the light unit status/sensor information and resources from the resource server to determine an event occurrence, and in response reconfigure one or more of the lights units, provide information to the at least one user input/output device or initiate a predetermined action;
wherein the at least one sensor type is used to detect a tree branch or other vegetation in the vicinity of a light unit, and wherein the light unit determines whether to initiate a predetermined action.

4. The system of claim 3, wherein the predetermined action is sending a message to the central management system to schedule a maintenance request to remove or initiate a light emitter to inhibit growth/kill the tree branch or other vegetation.

5. A light management system for an outdoor lighting network system, comprising:
a plurality of outdoor light units each including at least one sensor type, where each of the light units communicates with at least one other light unit;
at least one user input/output device in communication with at one or more of said outdoor light units;
a central management system in communication with light units, said central management system sends control commands to one or more of said outdoor light units, in response to received outdoor light unit status/sensor information from one or more of said outdoor light units;
a resource server in communication with said central management system;
wherein the central management system uses the light unit status/sensor information and resources from the resource server to determine an event occurrence, and in response reconfigure one or more of the lights units, provide information to the at least one user input/output device or initiate a predetermined action;
wherein the resources from the resource server is driver fatigue/safety data and the central management system used the driver fatigue/safety data to determine light and/or color levels in the light units.

6. The system of claim 5, wherein the light and/or color levels in the light units are time varying.

7. A light management system for an outdoor lighting network system, comprising:
a plurality of outdoor light units each including at least one sensor type, where each of the light units communicates with at least one other light unit;
at least one user input/output device in communication with at one or more of said outdoor light units;
a central management system in communication with light units, said central management system sends control commands to one or more of said outdoor light units, in response to received outdoor light unit status/sensor information from one or more of said outdoor light units;
a resource server in communication with said central management system;
wherein the central management system uses the light unit status/sensor information and resources from the resource server to determine an event occurrence, and in response reconfigure one or more of the lights units, provide information to the at least one user input/output device or initiate a predetermined action;
wherein the at least one sensor type tracks a user and provides an indicator using the user input/output device to enable the user to maintain a predetermined pace or time as the user travels.

8. The system of claim 7, further providing a virtual ghost runner, using one or more of the user input/output devices.

9. A method of light management for outdoor lighting network system, the outdoor lighting network having a plurality of outdoor light units each including at least one sensor type and each outdoor light unit in communication with at least one other light unit, at least one user input/output device and a central management system in communication with the outdoor light units, the method comprising the steps of:
receiving, in the central management system, status/sensor information from the at least one sensor type and resources from the resource server;
sending, by the central management system, control commands to one or more of said outdoor light units,
wherein the central management system uses the light units to determine an event occurrence, and in response reconfigure one or more of the lights units, provide information to the at least one user input/output device or initiate a predetermined action;
wherein the status/sensor information is light reflection data from two or more light units, wherein the central management system processes the light reflection data and compares the light reflection data to a light reflection reference point for the respective light units, and determines reflection anomalies that indicates the event occurrence.

10. A method of light management for outdoor lighting network system, the outdoor lighting network having a plurality of outdoor light units each including at least one sensor type and each outdoor light unit in communication with at least one other light unit, at least one user input/output device and a central management system in communication with the outdoor light units, the method comprising the steps of:
receiving, in the central management system, status/sensor information from the at least one sensor type and resources from the resource server;
sending, by the central management system, control commands to one or more of said outdoor light units,
wherein the central management system uses the light units to determine an event occurrence, and in response reconfigure one or more of the lights units, provide information to the at least one user input/output device or initiate a predetermined action;
wherein the resources from the resource server is driver fatigue/safety data and the central management system used the driver fatigue/safety data to determine light and/or color levels in the light units.

\* \* \* \* \*